US012068941B2

United States Patent
Mary et al.

(10) Patent No.: US 12,068,941 B2
(45) Date of Patent: Aug. 20, 2024

(54) SYSTEM AND METHOD FOR RESILIENCY TESTING AT A SESSION LEVEL

(71) Applicant: Warner Bros. Entertainment Inc., Burbank, CA (US)

(72) Inventors: Hazel Diana Mary, East Norriton, PA (US); Erik Fortune, Redmond, WA (US); Michael Magpayo, New York, NY (US); Fan You, Lynnwood, WA (US)

(73) Assignee: Warner Bros. Entertainment Inc., Burbank, CA (US)

( * ) Notice: Subject to any disclaimer, the term of this patent is extended or adjusted under 35 U.S.C. 154(b) by 0 days.

(21) Appl. No.: 18/148,009

(22) Filed: Dec. 29, 2022

(65) Prior Publication Data

US 2024/0223488 A1 Jul. 4, 2024

(51) Int. Cl.
- *G06F 15/16* (2006.01)
- *H04L 43/022* (2022.01)
- *H04L 43/067* (2022.01)
- *H04L 43/0823* (2022.01)
- *H04L 43/50* (2022.01)

(52) U.S. Cl.
CPC ............ *H04L 43/50* (2013.01); *H04L 43/022* (2013.01); *H04L 43/067* (2013.01); *H04L 43/0823* (2013.01)

(58) Field of Classification Search
CPC ..... H04L 43/50; H04L 43/022; H04L 43/067; H04L 43/0823
USPC .................................. 709/202–203, 223–224
See application file for complete search history.

(56) References Cited

U.S. PATENT DOCUMENTS

| | | | | |
|---|---|---|---|---|
| 5,046,068 | A * | 9/1991 | Kubo | G06F 11/2736 714/25 |
| 7,185,232 | B1 * | 2/2007 | Leavy | H04L 43/50 714/41 |
| 8,699,356 | B2 * | 4/2014 | Smart | H04L 43/50 370/242 |
| 9,842,045 | B2 * | 12/2017 | Heorhiadi | H04L 43/50 |
| 10,866,851 | B2 * | 12/2020 | Basiri | H04L 43/50 |
| 10,986,013 | B1 * | 4/2021 | Theimer | H04L 43/50 |
| 11,080,157 | B1 * | 8/2021 | Roberts | H04L 43/50 |
| 2017/0024299 | A1 * | 1/2017 | Deng | G06F 11/3414 |
| 2022/0100599 | A1 * | 3/2022 | Abuelela | H04L 43/50 |
| 2022/0255817 | A1 * | 8/2022 | Hong | H04L 43/067 |
| 2023/0281184 | A1 * | 9/2023 | Mary | H04L 67/142 707/690 |

* cited by examiner

*Primary Examiner* — Bharat Barot
(74) *Attorney, Agent, or Firm* — Alston & Bird LLP

(57) ABSTRACT

Provided is a system and method for resiliency testing at a session level. A fault injection request is received from a client device associated with a user, via a user interface. The fault injection request defines an active impairment of one of a service or an endpoint with a blast radius restricted to a scope of the received fault injection request. The scope of the received fault injection request corresponds to a first session in a production environment or a lower environment. A client request is received from the client device within the blast radius of the active impairment. Based on the fault injection request and a persistence within the blast radius, the one of the service or the endpoint is impaired in the first session. A response, received from an entity associated with the one of the service or the endpoint, is transmitted to the client device.

20 Claims, 10 Drawing Sheets

SYSTEM AND METHOD FOR RESILIENCY TESTING AT A SESSION LEVEL

CROSS-REFERENCE TO RELATED APPLICATIONS/INCORPORATED BY REFERENCE

None.

FIELD OF TECHNOLOGY

The present disclosure relates to chaos engineering in a multi-technology environment. More specifically, various embodiments of the disclosure relate to a system and method for resiliency testing at a session level.

BACKGROUND

Owing to recent advancements in the field of cloud computing and communication technology, an exponential demand for various types of multi-tier systems, services, and resources in multi-technology environment is being witnessed like never before. A multi-technology environment is complex and thus, has a higher degree of undesirable issues, such as failures, errors, vulnerability, and even system crashes. Additionally, there are higher chances of compromised availability, potential data loss, downtime risks, and security and privacy issues between tiers to surface in the multi-technology environment, which may ultimately lead to monetary loss, data loss, as well as reputational damages to the organizations and providers of such systems, services, and/or resources.

To mitigate such issues, as discussed above, and check how the system performs under real-life or chaotic conditions in the face of unexpected external conditions, chaos engineering comes to rescue and describes various approaches for testing the resiliency of the systems, services, and/or resources in a multi-technology environment. Chaos engineering may refer to a process of creating chaos, i.e., intentionally introducing unexpected or unplanned faults, in the system, service, or resources at various levels to test the resiliency of the complete stack. This process may be utilized to determine how the systems, services, and/or resources will react in response to the introduced fault. The results of such experiments may then be evaluated to determine whether the systems, services, and/or resources can provide an adequate quality of service (QoS) during such adverse conditions. However, performing chaos engineering is often difficult because depending on the complexity of the problem, a significant load is required for capacity testing which are not instrumented.

Traditional methods and systems of chaos engineering includes creating the chaos, such as turning off a system, making the system unreachable through the network by blocking inbound connections, resetting domain name services, updating routing configurations, mocking partner integrations, internal subsystems, introducing delays in response and the like impact everyone in the multi-technology environment. So, everyone using the environment, who encounters that system, service or resources being tested will be impacted at that time, even the ones who are not testing the failure. Though failures created for such type of testing are restricted to some subset of the users (e.g., percentage of traffic, cohort, etc.) in order to restrict a blast radius, yet, users, availability metrics and circuit breakers in that test group are impacted. For example, consider a streaming service testing a failure of inbound connections for a video stream. In such scenario, a tester may create inbound connection for the video stream to test the response of the system in the event of component failure by inducing it, further referred to as Gameday System Testing. However, while testing, actual customers (not targeted but an arbitrary subset) who may want to watch the video stream, may not be able to watch it due to testing.

In existing method and system, some devices, such as set top boxes and connected televisions, may not always let the tester to mock responses through proxies for testing. In such scenarios, the appropriate approach may be to do a percentage rollout of the error, such as an A/B test, or randomly creating errors through chaos testing. Deterministically hitting the failure path may require the experiment or chaos causing issues to be turned on for a high percentage of the users, which may work, however, there may be a user impact from such testing as well.

In another existing method and system, resiliency testing may be performed by setting-up cohorts for each experience and associating each test to specific accounts. However, such testing may get cumbersome when there are multiple tests running simultaneously since the control group must not have any test being run on them. Therefore, it may lead to people maintaining tracking files or spreadsheets where different cohorts are listed and validated to not have interference with each other. It may not be necessarily easy when there are a lot of tests needed at the same time, such as for a big event.

Therefore, for failure testing and resiliency testing to be frequent and in customary practice, multiple barriers may be encountered for such testing, for example, optically through user impact, operationally in creating the failure and recovery, and organizationally in the level of impact to others using the same environment needs to be low. Further, the level of control over such elevated access is required to be properly controlled and tested for vulnerabilities.

Further limitations and disadvantages of conventional and traditional approaches will become apparent to one of skill in the art, through comparison of such systems with some aspects of the present disclosure as set forth in the remainder of the present application with reference to the drawings.

BRIEF DESCRIPTION OF SEVERAL VIEWS OF THE DRAWINGS

Systems and/or methods are provided for resiliency testing at a session level, substantially as shown in and/or described in connection with at least one of the figures, as set forth more completely in the claims.

These and other advantages, aspects, and novel features of the present disclosure, as well as details of an illustrated embodiment thereof, will be more fully understood from the following description and drawings.

BRIEF DESCRIPTION OF SEVERAL VIEWS OF THE DRAWINGS

Figure 1:
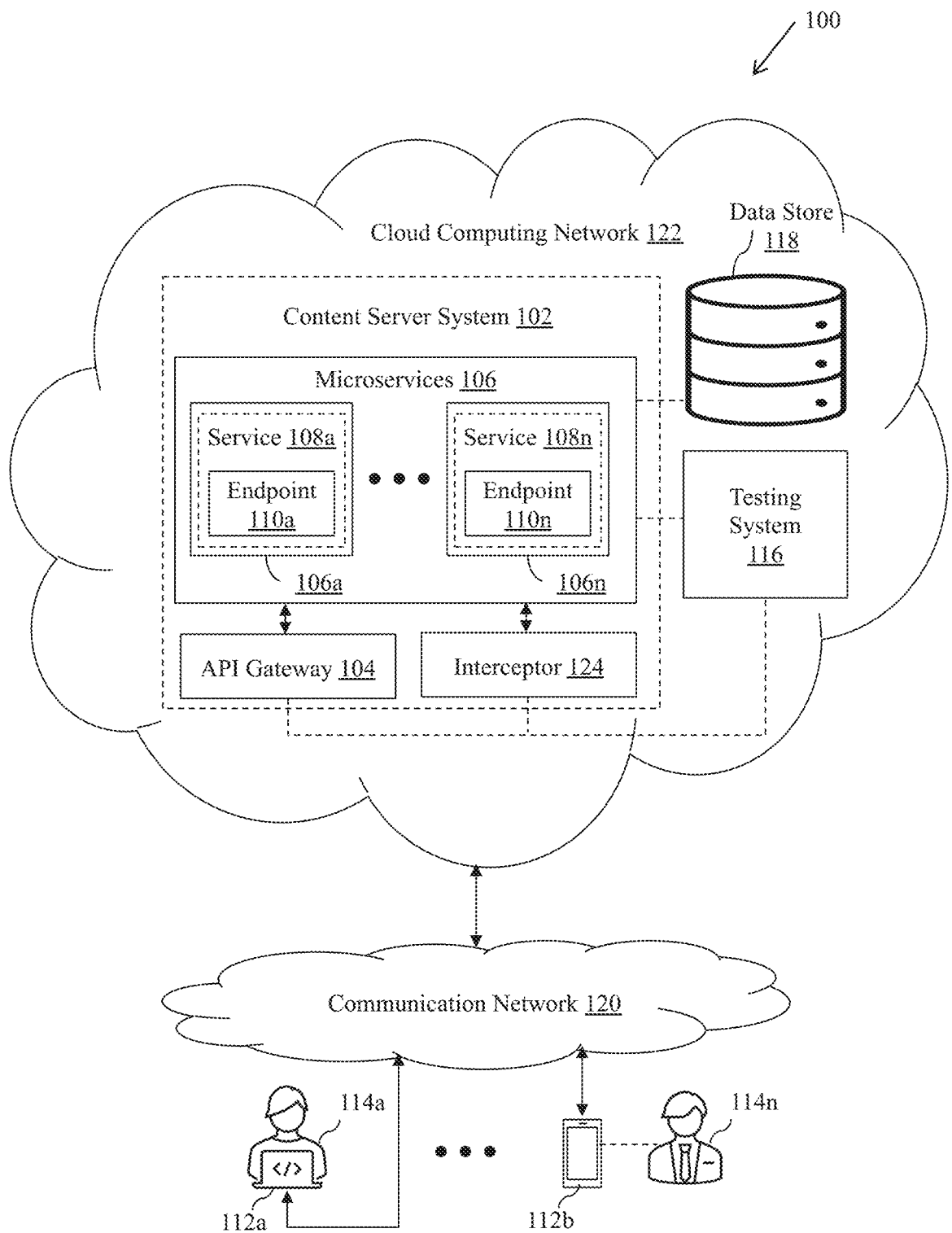

The technology described herein is illustrated by way of example and not limited in the accompanying figures in which like reference numerals indicate similar elements and in which:

FIG. 1 is a block diagram that illustrates an exemplary environment for resiliency testing at a session level, in accordance with an exemplary embodiment of the disclosure.

Figure 2:
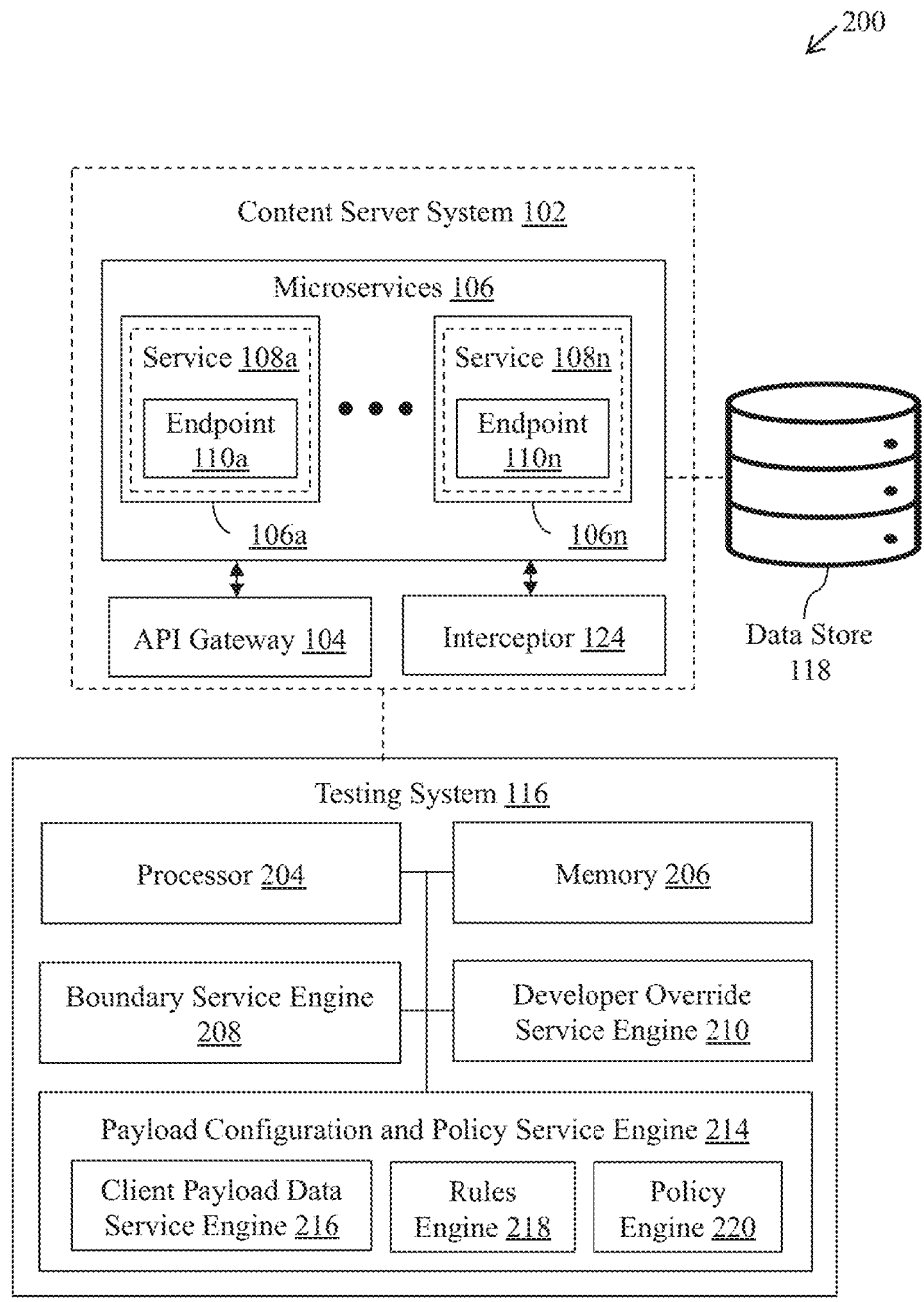

FIG. 2 is a block diagram that illustrates an exemplary testing system for resiliency testing at a session level, in accordance with an exemplary embodiment of the disclosure.

Figure 3:
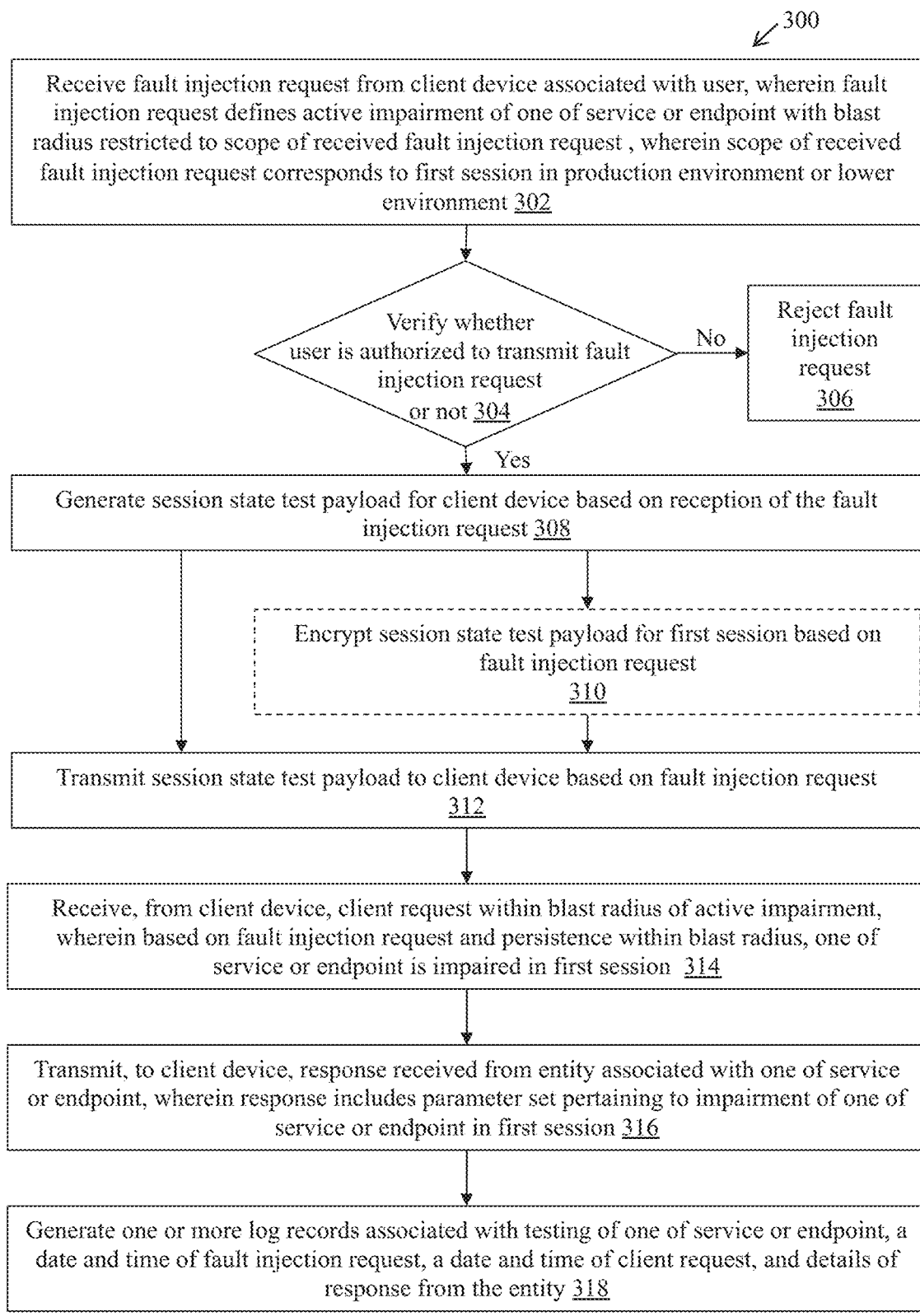

FIG. 3 is a flowchart that illustrates exemplary operations for resiliency testing at a session level, in accordance with an exemplary embodiment of the disclosure.

Figure 4:
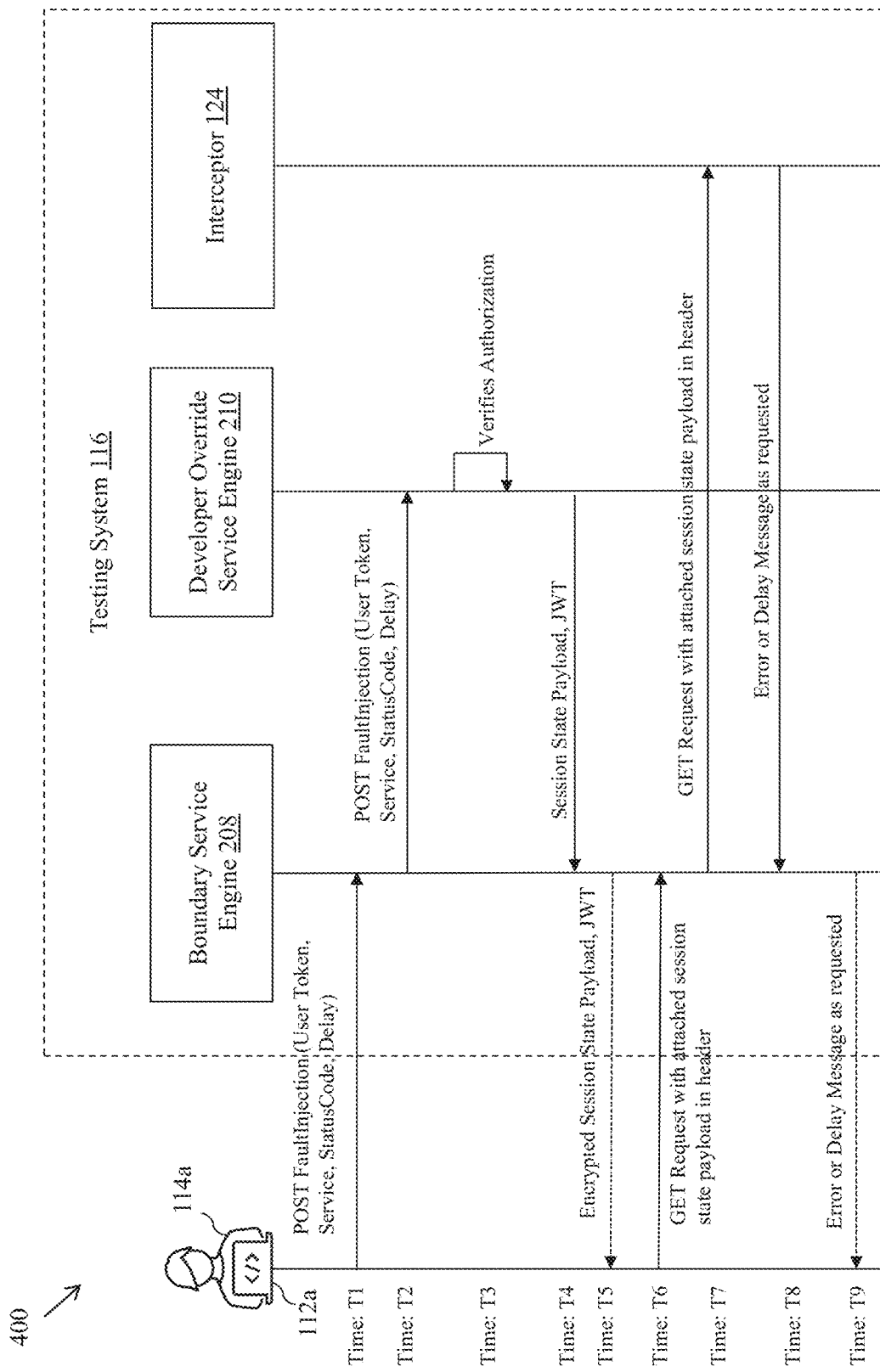

FIG. 4 is a sequence diagram that illustrates sequence and dataflow operations in a testing system for resiliency testing at a session level, in accordance with an exemplary embodiment of the disclosure.

Figure 5A:
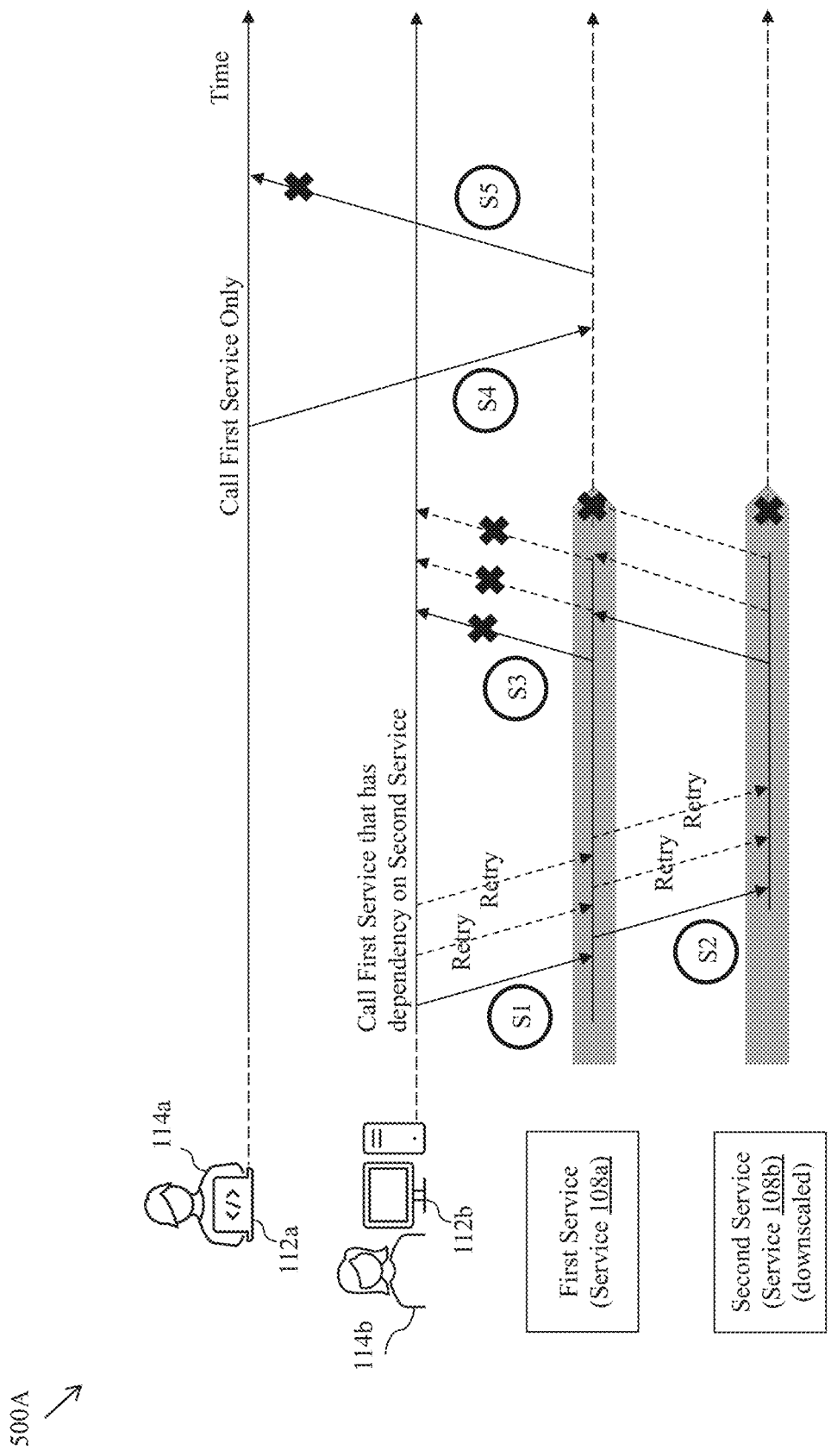

FIG. 5A is a first sequence and dataflow diagram that depicts an exemplary scenario of cascading failures and testing client application, in accordance with an exemplary embodiment of the disclosure.

Figure 5B:
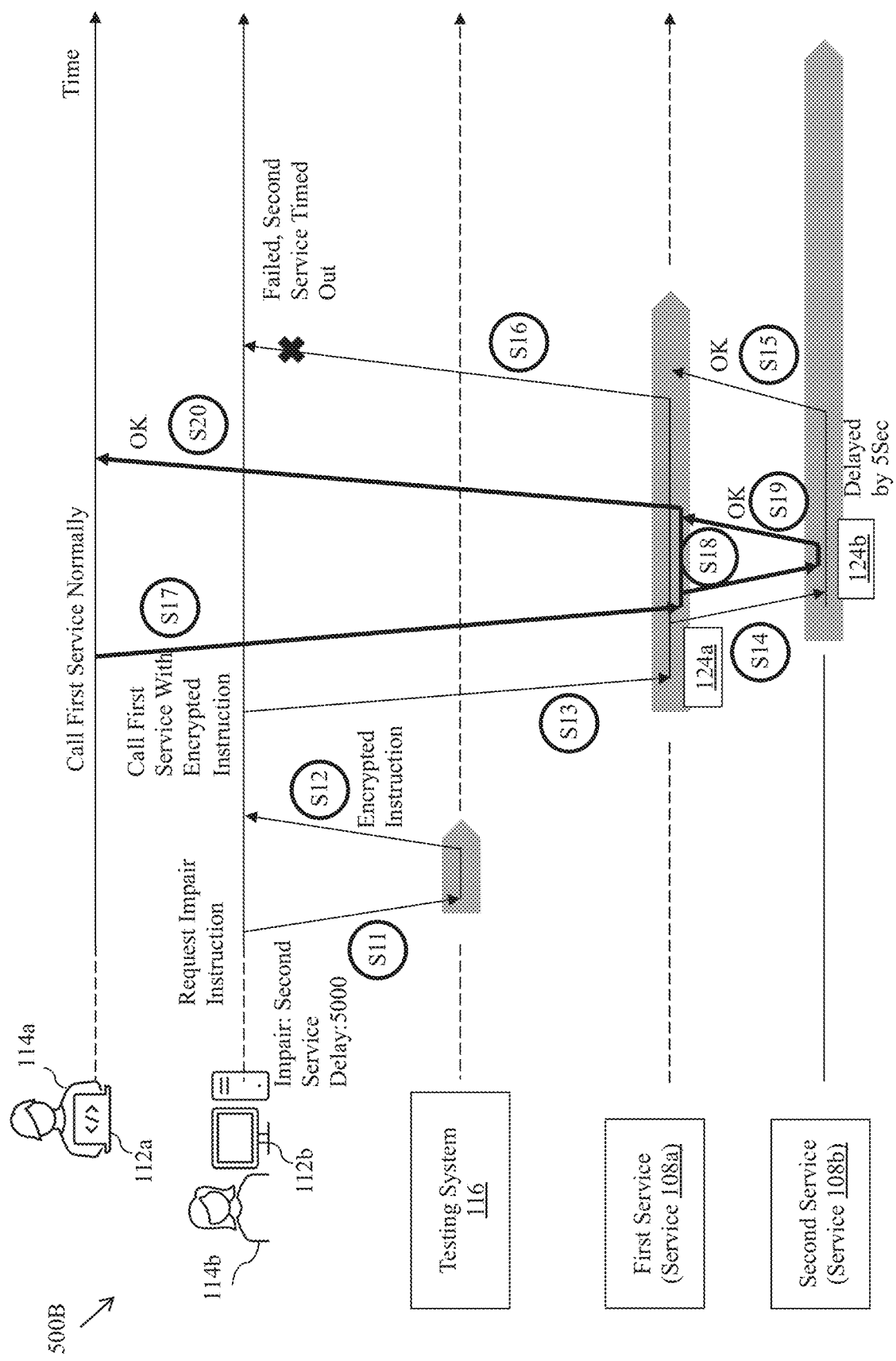

FIG. 5B is a second sequence and dataflow diagram that depicts exemplary sequence and dataflow operations for resiliency testing at a session level in case of cascading failures, in accordance with an exemplary embodiment of the disclosure.

Figure 6:
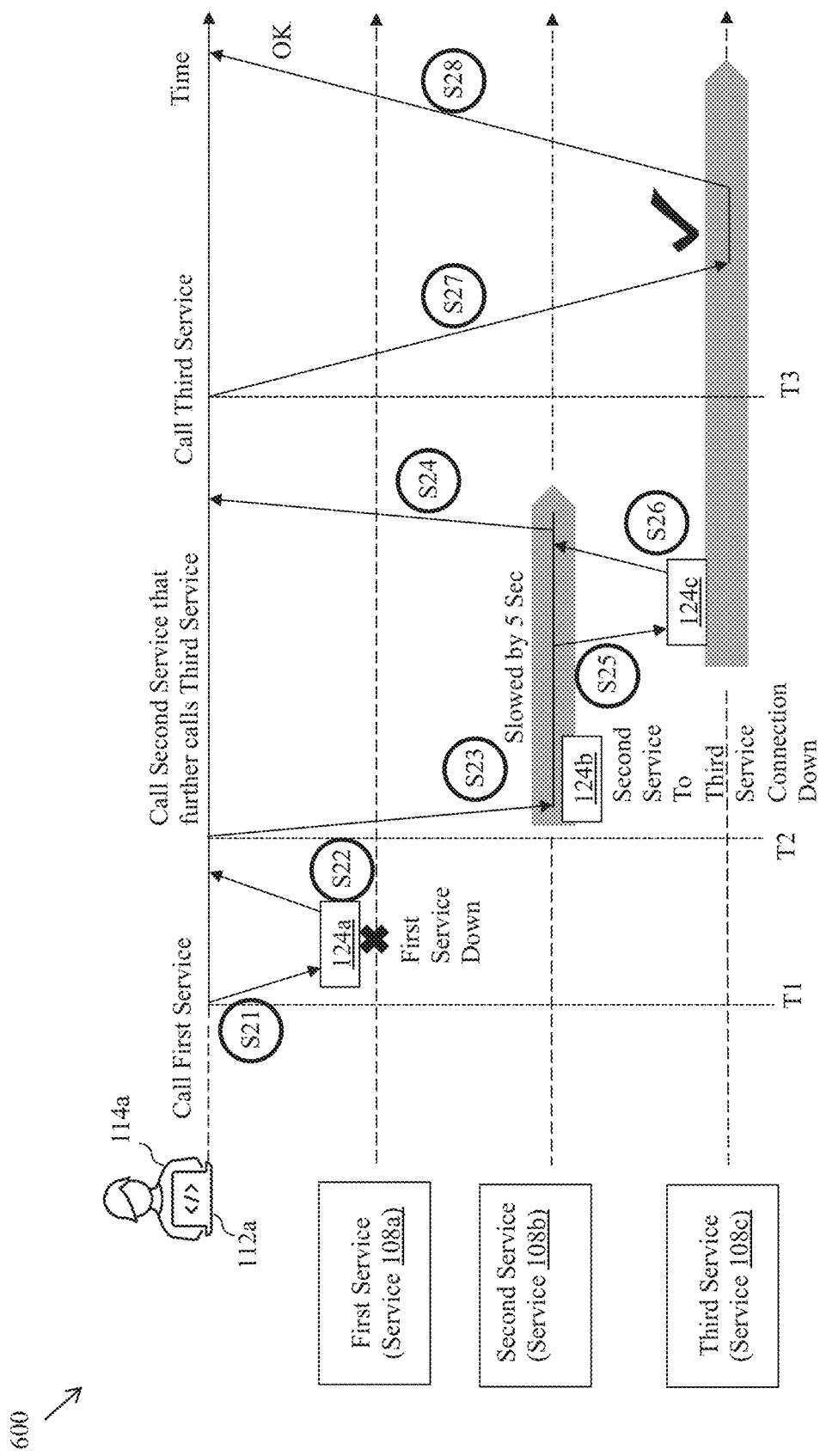

FIG. 6 is a third sequence and dataflow diagram that depicts an exemplary use case of retaining of impairment for all the calls in a session, in accordance with an exemplary embodiment of the disclosure.

Figure 7:
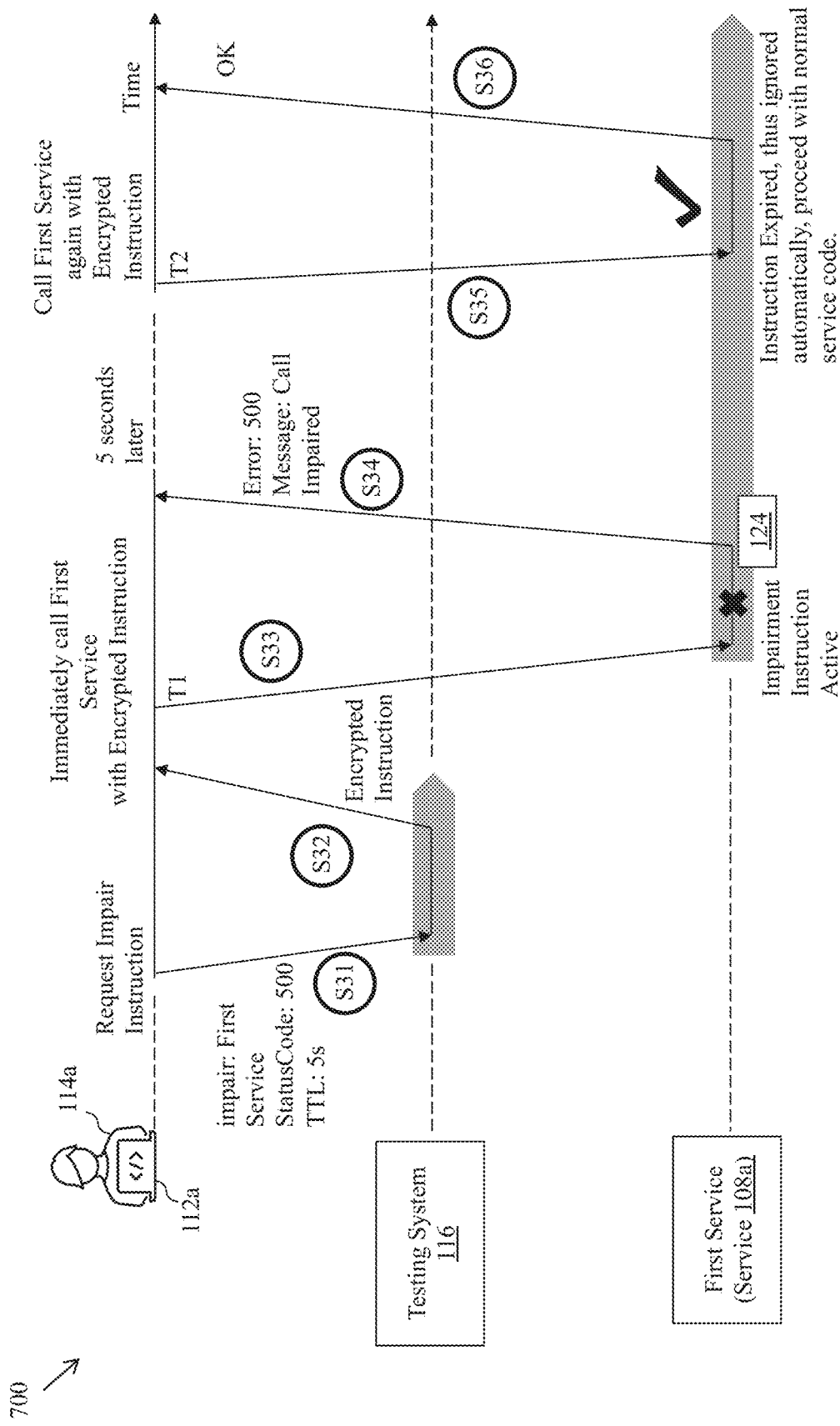

FIG. 7 is a fourth sequence and dataflow diagram that depicts an exemplary use case of self-destruction of fault injection request, in accordance with an exemplary embodiment of the disclosure.

Figure 8:
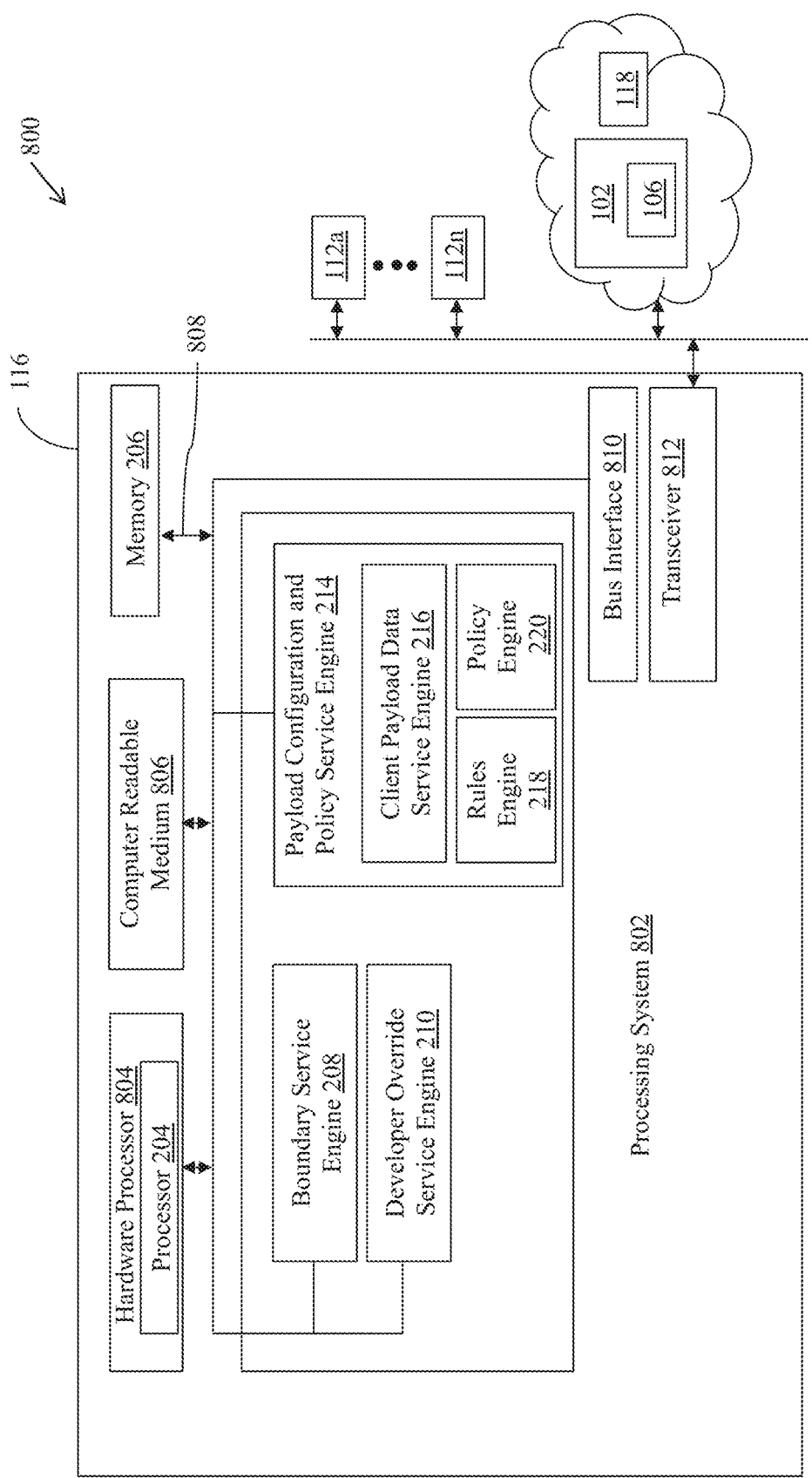

FIG. 8 is a conceptual diagram illustrating an example of a hardware implementation for the testing system of FIG. 2 employing a processing system, in accordance with an exemplary embodiment of the disclosure.

Figure 9:
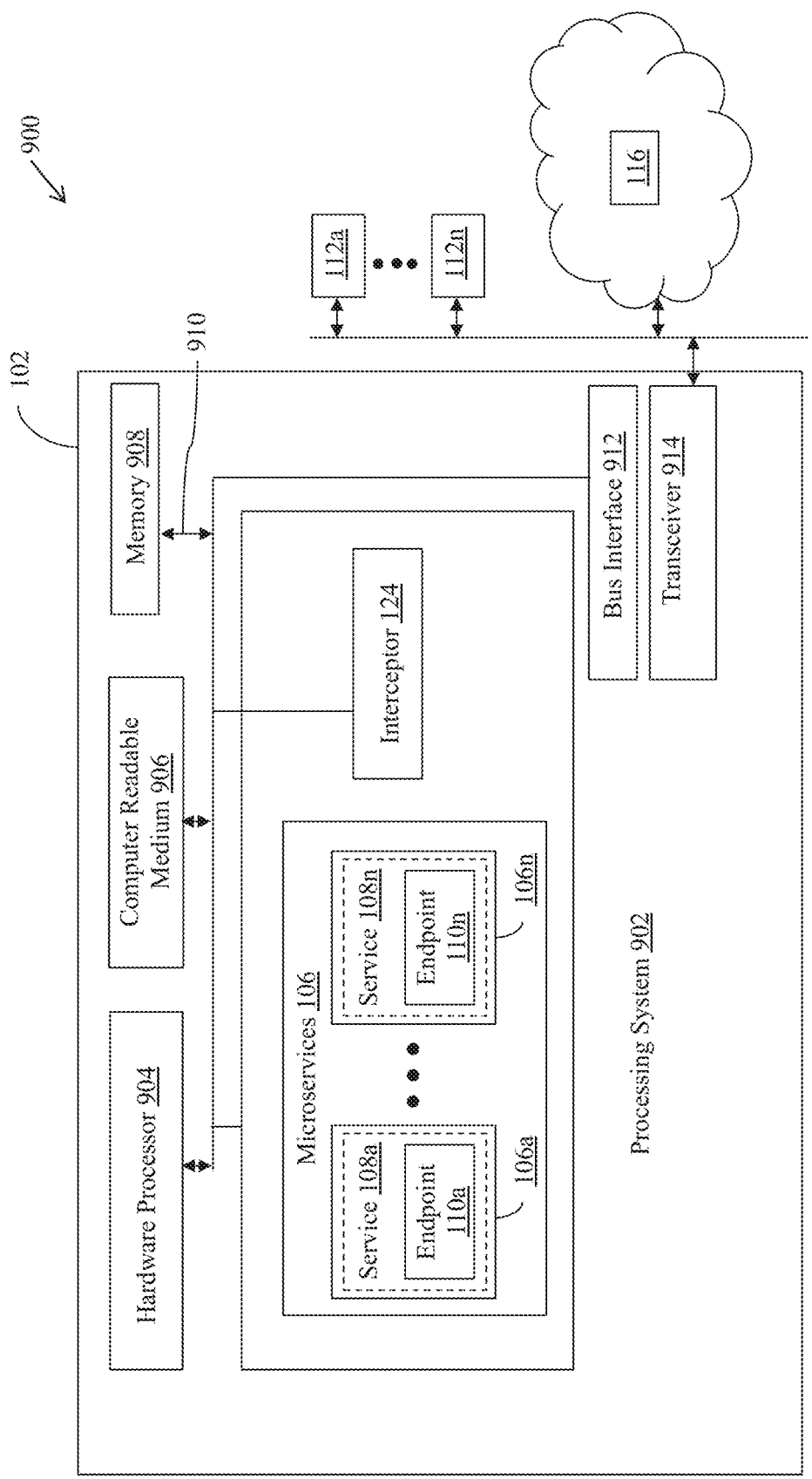

FIG. 9 is a conceptual diagram illustrating an example of a hardware implementation for the content server system of FIG. 1 employing a processing system, in accordance with an exemplary embodiment of the disclosure.

DETAILED DESCRIPTION OF THE DISCLOSURE

Certain embodiments of the present disclosure, that correspond to a system and a method for resiliency testing at a session level, are described in detail with reference to the drawings. Resilience testing is a testing method that may be performed to evaluate how a system, service, or resource will perform under stress or in real-life conditions. For example, software engineers may want to test how a service will handle a large influx of users while network interfaces are disabled. Resilience testing also demonstrates an ability of the system, service, or resource to recover after outages and other random stressors. Such testing further indicates where improvements can be made to the system, service, or resource to make the system, service, or resource more resilient and thereby ultimately enhancing the user experience.

As described above, the traditional methods of resiliency testing on the system, service or resource may have major barriers at various levels, such as optical, operational, and organizational levels. Further, a level of control over an elevated access is required to be properly controlled and tested for vulnerabilities. Furthermore, conducting pervasive or multiple tests in parallel without interference from the others becomes difficult especially when setting up control and test groups for each experiment.

In comparison to the traditional methodologies, the disclosed system may be configured to test the resiliency of the system, service, or the resource at a session level. Session level fault injection primarily focuses on testing failure modes in an application and how that is impacted by failures that will be happening in the environment. More specifically, the system and method described herein is directed towards injecting session level faults into a system, service, or resource to test the behavior of the system, service, or resource deterministically and surgically, at the session level, when they are experiencing internal or external failures or capacity constraints. In other words, such testing of the system, service or resource is associated with a particular session and therefore the impact of such testing is limited to a single session and is not reflected to other users of the system, service, or resource. Various exemplary use cases may include, but are not limited to, service failures, latency or error-based issue opening the circuit breakers, capacity issues causing latency and timeouts on services, data store experiencing high latency and high error rate and connectivity issues.

In accordance with an embodiment of the disclosure, a method is provided for resiliency testing at a session level. The method may include receiving, by a processor, a fault injection request from a client device associated with a user, via a user interface. The fault injection request may define an active impairment of one of a service or an endpoint with a blast radius restricted to a scope of the received fault injection request. The scope of the received fault injection request may correspond to a first session in a production environment or a lower environment. The method may further include receiving, by the processor, a client request within the blast radius of the active impairment from the client device. Based on the fault injection request and a persistence within the blast radius, the one of the service or the endpoint is impaired in the first session. The method may further include transmitting, by the processor, a response received from an entity associated with the one of the service or the endpoint. The response may comprise characteristic variables pertaining to the impairment of the one of the service or the endpoint in the first session.

FIG. 1 is a block diagram that illustrates an exemplary environment for resiliency testing at a session level, in accordance with an exemplary embodiment of the disclosure. Referring to FIG. 1, there is shown a network environment 100 which may include a content server system 102, an application programming interface (API) gateway 104, microservices 106, a plurality of services 108a, . . . , 108n, and a plurality of endpoints 110a, . . . , 110n. The network environment 100 may further include a plurality of client devices 112a, . . . , 112n, a plurality of users 114a, . . . , 114n associated with the plurality of client devices 112a, . . . , 112n, a testing system 116, a data store 118, and a communication network 120. In accordance with an embodiment, the network environment 100 may further include a cloud computing network 122 implementing various servers located worldwide providing cloud services. The content server system 102 is shown to further include an interceptor 124.

The content server system 102 may comprise suitable logic, circuitry, interfaces, and/or code that may be configured to be tested by one or more of the plurality of client devices 112a, . . . , 112n, for example the client device 112a, for resiliency of one or more services or applications based on a session level fault injection. The fault injection request defines an active impairment of a service or an endpoint with a blast radius restricted to a scope of the received fault injection request. The scope of the received fault injection request corresponds to a first session in a production environment or a lower environment. Based on the fault injection request and a persistence within the blast radius, the service or the endpoint is impaired in the first session.

In accordance with an embodiment, the computing functionalities of the content server system 102 disclosed herein may be implemented in one or more silicon cores in a reduced instruction set computing (RISC) processor, an application-specific integrated circuit (ASIC) processor, a complex instruction set computing (CISC) processor, field programmable gate arrays (FPGAs), and other semiconductor chips, processors, or control circuits. It should be noted that the terms "processor" or "microprocessor" referred herein include not only a traditional microprocessor (such as Intel's® industry-leading x86 and x64 architectures), but also graphics processors, matrix processors, and any ASIC, FPGA, microcontroller, digital signal processor (DSP), programmable logic device, programmable logic array (PLA), microcode, instruction set, emulated or virtual machine processor, or any similar device, combination of devices, or logic elements (hardware or software) that permit the execution of instructions.

The API gateway 104 may include suitable logic, interfaces, and/or code that may correspond to an entry point for a client device. Instead of calling the plurality of services 108a, ..., 108n directly, the client device may call the API gateway 104, which forwards the call to the appropriate services at the back end. Thus, the API gateway 104 decouples the plurality of client device 112a, ..., 112n from the plurality of services 108a, ..., 108n. The plurality of services 108a, ..., 108n may be versioned or refactored without needing to update all of the client devices. The API gateway 104 may perform other functions as well, such as authentication, logging, secure socket layer (SSL) termination, load balancing, throttling, caching, transformation, validation, and the like.

The microservices 106 may include suitable logic, circuitry, interfaces, and/or code that may correspond to an architectural design for building distributed and scalable applications. The microservices 106 allow for each of the plurality of services 108a, ..., 108n, to scale or update without disrupting other services in an application. Each of the microservices 106 may allow a large application to be separated into smaller independent parts, with each part having its own realm of responsibility to accomplish an overall objective of the application. In other words, the microservices architecture treats each function of the large application as an independent service that can be altered, updated, or taken down without affecting the rest of the application. To serve a single user request, a microservices-based application may call on multiple internal microservices to compose its response. Various examples of a microservices architecture may include website migration, media content, data processing, and transactions and invoices.

In accordance with an embodiment, one microservice, for example the service 108a, may be a single node that communicates to another microservice, for example the service 108n, via an API. Many APIs are RESTful and exposed through an endpoint like an HTTP endpoint. In accordance with an embodiment, GET, POST, PUT, DELETE commands, in conjunction with a URL, may be used for fetching data or giving data to the API.

A well-suited microservices architecture example may use containers that enable a developer to focus on developing each of the plurality of services 108a, ..., 108n, without worrying about the dependencies. Modern cloud-native applications are usually built as microservices 106 using containers. Containers may be used to scale up or down the microservices 106. As illustrated in FIG. 1, each of the microservices 106, i.e., the plurality of services 108a, ..., 108n, runs in a corresponding container from the plurality of containers, that provide a lightweight runtime environment in the network environment 100.

Each of the plurality of services 108a, ..., 108n may include suitable logic, interfaces, and/or code that may correspond to a software functionality or a set of software functionalities at internal level provided by the content server system 102. Different users may reuse the plurality of services 108a, ..., 108n for different purposes, together with the policies that control its usage. Each of the plurality of services 108a, ..., 108n may correspond to one of the microservices 106 or may further include a set of microservices. Examples of the plurality of services 108a, ..., 108n may include, but are not limited to, profiles service, privacy settings service, entitlements service, and the like.

Each of the plurality of endpoints 110a, ..., 110n may include suitable logic, circuitry, interfaces, and/or code that may correspond to a digital location at the server-side of the network environment 100 for providing various services at external level. In accordance with an embodiment, the endpoint 110a, such as endpoint URLs, may be used by an API to retrieve requested resources or services at external level. In accordance with another embodiment, the endpoint 110a may correspond to a physical device, such as a mobile device, a desktop computer, a virtual machine, an embedded device, or a server, which connects to the communication network 120 and provides a desired functionality. In one configuration, the service 108a and the endpoint 110a may be separate entities. In another configuration, the endpoint 110a may be integrated with the service 108a to provide a secure and direct connections to the service 108a.

Each of the plurality of client devices 112a, ..., 112n may correspond to an electronic device having an application installed on it and used by the corresponding user from the plurality of users 114a, ..., 114n. Each of the plurality of client devices 112a, ..., 112n may be configured to transmit the fault injection request to the content server system 102 via the communication network 120. Each of the plurality of client devices 112a, ..., 112n may be associated with a corresponding user from the plurality of users 114a, ..., 114n, who may be authorized for conducting the resiliency testing of one or more of the plurality of services 108a, ..., 108n, for example the service 108a, or one or more of the plurality of endpoints 110a, ..., 110n, for example the endpoint 110a. A requesting client device may be further configured to receive a response from an entity (such as a sidecar container) associated with the service 108a or the endpoint 110a, and output the received response on a user interface (UI) of the requesting client device. Examples of each of the plurality of client devices 112a, ..., 112n may include, but are not limited to, a computing device, a mainframe machine, a server, a computer workstation, a smartphone, a cellular phone, a mobile phone, a gaming device, a tablet, a gaming device, and/or a consumer electronic device.

In accordance with an embodiment, one or more of the plurality of client devices 112a, ..., 112n may be configured to receive session state test payload from the one or more of services 108a, ..., 108n, as described herein, based on current client context information, such as current location, a type of client device, user information (e.g., what the client is entitled to receive), user preferences, and so on. The session state may comprise individual payload datasets, each of which may be visible, encoded or encrypted depending on a desired level of privacy and security for a given payload. Because the content server system 102 relies on what a client device sends, to avoid tampering, a typical session state test payload may be encoded (e.g., signed with a cryptographic signature) and/or encrypted.

Each of the plurality of client devices 112a, . . . , 112n may be configured to attach the session state test payload (or more than one if appropriate) with a client request to the service 108a, and the service 108a may access that session state test payload as needed to perform some operation(s) to respond to the client request. The service 108a that receives the client request may communicate with one or more other services as part of the operation(s), which in turn may invoke other service(s), using the session state test payload or some relevant part thereof in the service-to-service communication(s).

With respect to determining the payloads that are appropriate for the content server system 102, in one implementation, the session state test payload may be organized generally based on their purpose and usage. In this way, each of the plurality of client devices 112a, . . . , 112n need not always send its entire session state test payload data with each client request to the service 108a, but only a relevant part (e.g., a single payload dataset) of the session state test payload data to the service 108a. Further, if the session state test payload data needs to be updated, updates may occur on an individual payload dataset basis rather than the entire session state test payload data. In other words, as any one of the logical domains may be expired independently and updated; any service in the group of participating services may determine a need to update. The use of individual session state test payloads reduces the amount of data exchanged among the client devices and services.

The testing system 116 may include suitable logic, circuitry, and interfaces, and/or code that may be configured to induce faults at a single session level for testing failure scenarios to increase the resiliency of an application assuming that a session state mechanism is enabled by the application. The testing system 116 may further perform validation of the incoming requests such that if the testing system 116 receives expired payload in the client request, the client request would be filtered out at the boundary and ignored and not applied to the session state.

The testing system 116 may implement a variety of services, such as a boundary service, and a developer override service, as described in further detail in FIG. 2. The services provided by the testing system 116 may enable the content server system 102 to undergo a testing situation, such as resiliency testing, based on session level fault injection generated by a client device. Accordingly, the content server system 102 may be enabled to resolve various undesirable performance issues, such as outages due to traffic patterns containing events that are hard to simulate, testing using normal operations without affecting real users. Such undesirable performance issues are usually related with, for example, scheduled movie/TV show premieres at a specific time, an event day for shopping, sudden security attack, offline viewing, and the like where there is a dramatic change in traffic in a short period of time.

It should be noted that various components of the testing system 116 may be implemented as a distributed processing system in the cloud computing network 122. However, such implementation should not be construed to be limiting and other implementations may also be deployed without any deviation from the scope of the disclosure. For example, various components of the testing system 116 may be implemented as a system integrated with the content server system 102 in the network environment 100.

The data store 118 may provide a persistence mechanism, such as a database storage engine, log files, and the like, to store a variety of data for the content server system 102 and the testing system 116. In accordance with an embodiment, for each microservice, a separate persistent data store may be used in a database-per-service pattern. The database-per-service pattern may ensure that the plurality of services 108a, . . . , 108n are loosely coupled and any change to one service's database does not impact any other service's database. However, the above-described pattern should not be construed to be limiting and other patterns, such as event sourcing pattern, API composition pattern, saga pattern, and the like, may also be implemented without any deviation from the scope of the disclosure.

The communication network 120 may include a communication medium through which the cloud computing network 122 and the plurality of client devices 112a, . . . , 112n may communicate with each other. The communication network 120 may be one of a wired connection or a wireless connection. Examples of the communication network 120 may include, but are not limited to, the Internet, a cloud network, a Wireless Fidelity (Wi-Fi) network, a Personal Area Network (PAN), a Local Area Network (LAN), or a Metropolitan Area Network (MAN). Various devices in the network environment 100 may be configured to connect to the communication network 120 in accordance with various wired and wireless communication protocols. Examples of such wired and wireless communication protocols may include, but are not limited to, at least one of a Transmission Control Protocol and Internet Protocol (TCP/IP), User Datagram Protocol (UDP), Hypertext Transfer Protocol (HTTP), File Transfer Protocol (FTP), Zig Bee, EDGE, IEEE 802.11, light fidelity (Li-Fi), 802.16, IEEE 802.11s, IEEE 802.11g, multi-hop communication, wireless access point (AP), device to device communication, cellular communication protocols, and Bluetooth (BT) communication protocols.

The cloud computing network 122 may include various cloud resources, services, and/or functionalities (such as the content server system 102, the API gateway 104, the microservices 106, the plurality of services 108a, . . . , 108n, the plurality of endpoints 110a, . . . , 110n, the testing system 116, and the data store 118) that may be utilized by or for the edge resources, via a combination of the local area network and the wide area network, realized by the communication network 120.

In accordance with various embodiments, various cloud-computing providers may offer different services according to different models, such as Infrastructure as a Service (IaaS), Platform as a Service (PaaS), and Software as a Service (SaaS). The IaaS form of cloud computing service may offer computational, storage and networking resources on-demand, usually on a pay-as-you-go basis. Examples of the IaaS may include, but are not limited to, Amazon Web Services (AWS) Elastic Compute Cloud (EC2)® and Microsoft Azure®. The PaaS form of cloud computing service may provide a framework for application creation and deployment. For example, the technical stack, such as, AWS Beanstalk® and Google App Engine®, required for application development may be available on the cloud in the PaaS form, which requires no download or local installation. The SaaS form of cloud computing service may correspond to a web-based software deployment model that makes the software accessible from any device through a web browser, irrespective of where the software is hosted, which operating system it uses, or which language it is written in. Non-limiting examples of the SaaS may include, Microsoft Office 365®, ZoomInfo®, Dropbox®, and the like.

It should be noted that the cloud resources, services, and/or functionalities of the cloud computing network 122 should not be construed to be limiting based on the aforementioned examples. Other cloud resources, such as outsourced storage, processing power, databases, networking, analytics, artificial intelligence engines, navigation services, geolocation services, network or infrastructure management, payment processing, audio and video streaming, messaging, social networking, news, and software applications, may also be a part of the communication network 120, without any deviation from the scope of the disclosure.

The interceptor 124 may comprise suitable logic, circuitry, interfaces, and/or code that may define a container associated with the service 108a or the endpoint 110a, and may provide a sidecar service that may function as a middleware between the client device 112a and the impaired service 108a or the endpoint 110a of the content server system 102. The interceptor 124 may intercept the client request (with an attached session state test payload) generated by the client device 112a and decrypted by a boundary service engine of the testing system 116. In accordance with an embodiment, the interceptor 124 may be configured to return a correct error code corresponding to the service 108a or the endpoint 110a. The service 108a or the endpoint 110a does not require any change as the client request is not processed to return the error code. In accordance with another embodiment, the client request without any attached session state test payload may be passed through the interceptor 124 to the service 108a or the endpoint 110a as usual. In accordance with another embodiment, the interceptor 124 may further transmit one or more responses received from the service 108a or the endpoint 110a to the client device 112a.

In operation, one of the plurality of users 114a, . . . , 114n, such as the user 114a, may opt to perform resiliency testing and test for a failure mode by generating a fault injection request at one of the plurality of client devices 112a, . . . , 112n, such as the client device 112a. In accordance with an embodiment, the fault injection request may be generated via a user interface (UI) displayed at the client device 112a and hosted by the content server system 102. The fault injection request may define an active impairment of one of the service 108a or the endpoint 110a provided by one of the microservices 106 in the content server system 102. The fault injection request may define the active impairment with a blast radius that may be restricted to a scope in which the fault injection request may be received, such as a first session in a production or lower environment. The impairment may be introduced in the service 108a or the endpoint 110a via the fault injection request to check the resiliency of the service 108a or the endpoint 110a in an event of the impairment. Such fault injection request may be transmitted to the cloud computing network 122, via the communication network 120. In accordance with various embodiments, one or more faults may be injected in the fault injection request, for example, service-to-service connectivity, time-out, cascading impairments across other services, independent of a change of call patterns and connectivity graph.

Upon receiving the fault injection request from the client device 112a, the testing system 116 in the cloud computing network 122 may verify an authorization of the user 114a to confirm whether the user 114a or the client device 112a is allowed to invoke the functionality of resiliency testing of the service 108a or the endpoint 110a provided by one of the microservices 106 in the content server system 102. The testing system 116 may generate a session state test payload for the client device 112a associated with the authorized user 114a. The session state test payload may include impairment instructions. Based on the fault injection request and a persistence within the blast radius, the one of the service 108a or the endpoint 110a may be impaired in the first session by the interceptor 124 of the content server system 102.

In accordance with an embodiment, a set of functional requirements may be required for implementation of the present disclosure using the session state test payloads. Described below is Table 1 that includes tasks and certain non-limiting examples of set of functional requirements or acceptance criteria that are required for implementing the session state test payloads.

TABLE 1

| Task | Acceptance Criteria |
| --- | --- |
| Define session state test payload and implement it | 1. Failure (5xx, 4xx), Timeout, High Latency but succeeds (For tuning application load balancer (ALB)/elastic load balancer (ELB) timeouts) and Unreachable faults should be injectable.<br>2. Testing should be not only at the domain level but also at the path level.<br>3. External facing services need to be at an endpoint level. Internal services can be at service level. |
| Implement Propagation/ Expiration logic | 1. There should be a clear way to inject a failure and expire an active injected failure.<br>2. Injected failures at any service should be propagated all the way back to the client.<br>3. Injected failures should be logged and must be clearly marked as injected.<br>4. The client device must include the session state test payload in all requests.<br>5. The session has to be authorized to use test payloads. |
| Middleware to process the session state test payload | 1. The session state test payload request must be processed by the middleware and corresponding responses must be returned.<br>2. The actual code in the failing endpoint does not have to be executed. It should fail atomically.<br>3. Ideally, the middleware should aim to reduce the need for integrations with every service.<br>4. If a database is failed, middleware should return an error for all access to that database. |
| End-to-end test | Add a TTL to ensure the payload expires or self-destructs after some time. |

In accordance with an embodiment, the testing system 116 may encrypt the session state test payload and transmit to the client device 112a, via the communication network 120. In accordance with an embodiment, the client device 112a may attach a client request with an encrypted session state test payload. The client device 112a may transmit the client request attached with the session state test payload. The interceptor 124 may intercept the client request to the content server system 102 under test, via the communication network 120. The interceptor 124 may correspond to one of a service container, a sidecar, a middleware, an integrated device or module, a separate service to hijack, or a common central repository utilized by the one of the service 108a or the endpoint 110a provided by one of the microservices 106 in the content server system 102.

The interceptor 124 may generate a response associated with the one of the service 108a or the endpoint 110a in the first session. The response may comprise characteristic variables pertaining to the impairment of the one of the service 108a or the endpoint 110a in the first session. The characteristic variables may comprise a template of behavioural parameters which may include at least an error message, or a delay response to be received by the user 114a on the client device 112a. The characteristic variables may further comprise a plurality of connectivity characteristics which may include at least one of a network path and a call pattern. The interceptor 124 may transmit the generated response back to the client device 112a and displayed on the UI of the client device 112a to be read by the user 114a.

In accordance with an embodiment, the testing system 116 may ensure that the content server system 102 behaves consistently by retaining or recreating the impairment for all calls in the first session by behaving erroneously or with latency for the specified blast radius. In accordance with another embodiment, the testing system 116 may further provide a way to change the configuration of induced faults for the first session, including resetting it at run time. The testing system 116 may store such configurations in a centralized or decentralized location, such as the data store 118, for easy access to a user or automated loading into a session. In accordance with another embodiment, the testing system 116 may include reporting requirements to validate that there is sufficient information for debugging when a failure occurs. Optionally, the testing system 116 may present automated detection of failures in dashboards based on changes to traffic patterns. In accordance with yet another embodiment, the testing system 116 may audit capabilities to log what is being tested when this mechanism is used, especially at scale. Further embodiments of the present disclosure are described in detail in the forthcoming figures.

FIG. 2 is a block diagram that illustrates an exemplary testing system for resiliency testing at a session level, in accordance with an exemplary embodiment of the disclosure. FIG. 2 is explained in conjunction with elements from FIG. 1. With reference to FIG. 2, there is shown a block diagram 200 of the testing system 116. The testing system 116 may include a network interface 202, a processor 204, a memory 206, and various processing engines, such as a boundary service engine 208, a developer override service engine 210, and a payload configuration and policy service engine 214. The payload configuration and policy service engine 214 may further include a client payload data service engine 216, a rules engine 218, and a policy engine 220. Such processing engines enable various software modules providing various services, such as boundary service, a developer override service, client payload data service, payload configuration and policy service, payload configuration and policy service, client payload data service, rules, and policies. The testing system 116 may be communicatively coupled to various cloud resources, such as the data store 118 and the microservices 106 comprising the plurality of services 108a, . . . , 108n and the plurality of endpoints 110a, . . . , running in the plurality of containers 106a, . . . , 106n.

The network interface 202 may include suitable logic, circuitry, and interfaces that may be configured to facilitate communication between the processor 204, the plurality of client devices 112a, . . . , 112n, the service 108a, and the various cloud resources from the cloud computing network 122, via the communication network 120. The network interface 202 may be implemented by use of various known technologies to support wired or wireless communication means with the communication network 120. The network interface 202 may include, for example, an antenna, a radio frequency (RF) transceiver, one or more amplifiers, a tuner, one or more oscillators, a digital signal processor, a coder-decoder (CODEC) chipset, a subscriber identity module (SIM) card, or a local buffer circuitry.

The network interface 202 may be configured to communicate via wireless communication with networks, such as the Internet, an Intranet or a wireless network, such as a cellular telephone network, a public switched telephonic network (PSTN), a radio access network (RAN), a wireless local area network (LAN), and a metropolitan area network (MAN). The wireless communication may use one or more of a plurality of communication standards, protocols and technologies, such as Global System for Mobile Communications (GSM), Enhanced Data GSM Environment (EDGE), wideband code division multiple access (W-CDMA), Long Term Evolution (LTE), code division multiple access (CDMA), time division multiple access (TDMA), Bluetooth, Wireless Fidelity (Wi-Fi) (such as IEEE 802.11a, IEEE 802.11b, IEEE 802.11g or IEEE 802.11n), voice over Internet Protocol (VoIP), light fidelity (Li-Fi), Worldwide Interoperability for Microwave Access (Wi-MAX), a protocol for email, instant messaging, and a Short Message Service (SMS).

The processor 204 may include suitable logic, circuitry, and interfaces that may be configured to execute program instructions associated with different operations to be executed by the testing system 116. For example, some of the operations may include, but are not limited to, receiving the fault injection request, encrypting the request, receiving the client request, and transmitting the response. The processor 204 may include one or more specialized processing units, which may be implemented as an integrated processor or a cluster of processors that perform the functions of the one or more specialized processing units, collectively. The processor 204 may be implemented based on a number of processor technologies known in the art. Examples of implementations of the processor 204 may be an x86-based processor, a Graphics Processing Unit (GPU), a Reduced Instruction Set Computing (RISC) processor, an Application-Specific Integrated Circuit (ASIC) processor, a Complex Instruction Set Computing (CISC) processor, a microcontroller, a central processing unit (CPU), and/or other computing circuits.

The memory 206 may include suitable logic, circuitry, interfaces, and/or code that may be configured to store the program instructions to be executed by the processor 204. In at least one embodiment, the memory 206 may store the fault injection request, the client request, the transmitted response, and the characteristic variables. The memory 206 may also store information associated with the blast radius. In accordance with an embodiment, the memory 206 may be further configured to store behavioural parameters, connectivity characteristics, and the like. Examples of implementation of the memory 206 may include, but are not limited to, Random Access Memory (RAM), Read Only Memory (ROM), Electrically Erasable Programmable Read-Only Memory (EEPROM), Hard Disk Drive (HDD), a Solid-State Drive (SSD), a CPU cache, and/or a Secure Digital (SD) card.

The boundary service engine 208 may comprise suitable logic, circuitry, interfaces, and/or code that may be configured to receive one or more requests, such as the fault injection request and the client request, from the client device 112a that may be intended for the service 108a or the endpoint 110a. In accordance with an embodiment, the boundary service engine 208 may be implemented at an edge of a network, such as a cloud network, associated with the service 108a, and the endpoint 110a. In accordance with an embodiment, the boundary service engine 208 may receive and process each incoming request generated at the client device 112*a* outside of the network associated with the service 108*a* or the endpoint 110*a*. In accordance with another embodiment, the boundary service engine 208 may process, i.e., encrypt, a response generated by the interceptor 124 and transmit to the client device 112*a*. In accordance with an embodiment, the boundary service engine 208 may implement one or more security rules and perform security checks on each incoming (and/or outgoing) request. In accordance with an embodiment, the boundary service engine 208 may correspond to a router, a switch, a hub, a security system (such as a firewall), or a virtual private network (VPN) associated with the content server system 102, the service 108*a*, and the endpoint 110*a*, provided said component can implement the logic of an interceptor.

It should be noted that in an embodiment the boundary service engine 208 is separate from the component under test, i.e., the content server system 102. In accordance with an embodiment, the logic of the boundary or edge may be implemented only by the boundary service engine 208. However, in other implementations, the the logic of the boundary or edge may be implemented by the network interface 202 that may be configured to intercept the traffic to the component under test, i.e., the content server system 102, without any deviation from the scope of the disclosure.

The developer override service engine 210 may comprise suitable logic, circuitry, interfaces, and/or code that may be configured to verify the request received from the client device 112*a*. Specifically, the developer override service engine 210 may be configured to verify an authorization of the user 114*a* who may be allowed to invoke the functionality of resiliency testing of the service 108*a* or the endpoint 110*a*. The developer override service engine 210 may be further configured to generate a session state test payload for the client device 112*a* associated with the authorized user 114*a*. The session state test payload may include impairment instructions to impair the service 108*a* or the endpoint 110*a*. The session state test payload may be generated for testing a server error on the service 108*a* or the endpoint 110*a* which has fault injection enabled. In accordance with an embodiment, the boundary service engine 208 may encrypt session state test payload and transmit to the client device 112*a* via the communication network 120. In accordance with an embodiment, the developer override service engine 210 may be an interior service.

The payload configuration and policy service engine 214 may comprise suitable logic, circuitry, interfaces, and/or code that may be configured to compute policy data for updating the payload based on inputs received from third party services or internal services. The policy data may correspond to updated payload data in accordance with various rules and policies defined by the rules engine and the policy engine, respectively.

The client payload data service engine 216 may comprise suitable logic, circuitry, interfaces, and/or code that provides a service which may be invoked when a client device from the plurality of client devices 112*a*, . . . , 112*n* generates a call or a client request with out-of-date payload data. The session state update requirement is detected. In accordance with an embodiment, a third-party service, such as a geo-location service, may be called upon by the boundary service engine 208 (or other client-facing service) to determine the updated payload data, such as a current location of the associated user. In accordance with another embodiment, internal services, such as entitlement service, profile service, and the like, may be called upon by the boundary service engine 208 (or other client-facing service) to determine the updated payload data, such as an updated profile information, entitlement information, and the like.

The boundary service engine 208 receives the updated payload data and sends that information and other data to the payload configuration and policy service, which in turn interprets the policy and returns to the boundary service engine 208. Based on this policy data, the boundary service engine 208 updates corresponding session state payloads and returns the payload dataset back to the client device. As an example, the globalization payload can correspond to session language, currency formats, date time formats, and the like.

The rules engine 218 may include suitable logic, circuitry, and interfaces, and/or code that may be configured to define rules for controlling interactions among various events and objects associated with service calls. The rules engine 218 may be further configured to convert the defined rules into standardized rules definitions based on a standardized format, for example, eXtended Markup language (XML). Such rules may be processed by other processors in real-time to generate actions affecting access control systems (not shown), other integrated network, and IT management systems or applications. Accordingly, the rules engine 218 enable rules-based workflows across integrated physical security, networking, and IT systems in the testing system 116 and the content server system 102.

The policy engine 220 may include suitable logic, circuitry, and interfaces, and/or code that may be configured to apply the defined rules on the services and data transactions processed by the testing system 116. A policy may be a user-defined logical entity that acts as a container for rules that are contained in a policy definition. The policy allows easy grouping of rules in order to understand, view, enable and order them as one group. The policy engine 220 creates a policy and then adds rules (defined by the rules engine 218) to the policy.

In operation, the microservices 106 comprising the plurality of services 108*a*, . . . , 108*n* and/or the plurality of endpoints 110*a*, . . . , 110*n* running in the plurality of containers 106*a*, . . . , 106*n* may be provided by the content server system 102 for the plurality of client devices 112*a*, . . . , 112*n*. Examples of the plurality of services 108*a*, . . . , 108*n* may include, but are not limited to, profiles service, privacy settings service, entitlements service, and the like. There may be a scenario when the content server system 102 may face the possibility of an outage during, for example, a scheduled movie/TV show premiere at a specific time, an event day for shopping, sudden security attack, offline viewing, and the like, where there may be a dramatic change in traffic in a short period of time. Accordingly, the user 114*a* associated with the client device 112*a* may opt to perform resiliency testing and test for a failure mode of the service 108*a* or the endpoint 110*a* by generating a fault injection request at the client device 112*a*.

In accordance with an embodiment, the fault injection request may be generated via the UI displayed at the client device 112*a* and hosted by the content server system 102. The fault injection request may define an active impairment (or a fault) of one of the service 108*a* or the endpoint 110*a* within a blast radius. In other words, the service 108*a* or the endpoint 110*a* may correspond to the scope of the fault injection request. The blast radius may be restricted to a scope in which the fault injection request may be received, such as a first session in a production or a lower environment. In accordance with various embodiments, one or more faults may be injected in, for example, service-to-service connectivity, time-out, cascading impairments across other services, independent of a change of call patterns and connectivity graph provided by the content server system 102. In accordance with an embodiment, the fault injection request may include a time-to-live (TTL) field to specify a defined timeframe after which a recovery mode is enabled. Such fault injection request may be transmitted to the cloud computing network 122, via the communication network 120.

The fault injection request may be received by the boundary service engine 208 of the testing system 116 in the cloud computing network 122. The boundary service engine 208 is the first external facing service that is at the edge between the VPN of the content server system 102 and the requests that are received from the client device 112a. The boundary service engine 208 performs all the security checks that the requests must go through before accessing any interior service of the content server system 102. The boundary service engine 208 may communicate the fault injection request to the developer override service engine 210 in the testing system 116.

Upon receiving the fault injection request from the boundary service engine 208, the developer override service engine 210 may be configured to verify an authorization of the user 114a to confirm whether the user 114a or the client device 112a is allowed to invoke the functionality of resiliency testing of the service 108a or the endpoint 110a provided by one of the microservices 106 in the content server system 102.

In accordance with an embodiment, the user 114a may be an unauthorized user. In such case, the developer override service engine 210 may reject the fault injection request. In accordance with another embodiment, the user 114a may be an authorized user. In such case, the developer override service engine 210 may accept the fault injection request. Accordingly, the one of the service 108a or the endpoint 110a provided by one of the microservices 106 in the content server system 102 may be impaired in the first session based on the fault injection request and a persistence within the blast radius.

The developer override service engine 210 may be further configured to generate a session state test payload for the client device 112a associated with the authorized user 114a. The session state test payload may include impairment instructions. The developer override service engine 210 may communicate the session state test payload to the boundary service engine 208. In turn, the boundary service engine 208 may encrypt the session state test payload and transmit the encrypted session state test payload to the client device 112a, via the communication network 120.

In accordance with an embodiment, the client device 112a may attach a client request with the received session state test payload. The client device 112a may transmit the client request attached with the session state test payload to the cloud computing network 122, via the communication network 120. The boundary service engine 208 may receive and decrypt the client request received from the client device 112a. The boundary service engine 208 may further transmit the client request attached with the session state test payload to the interceptor 124 of the content server system 102. The interceptor 124 may correspond to one of a service container, a middleware, an integrated device or module, a separate service to hijack and pre-process the fault injection request and the client request, or a common central repository utilized by the one of the service 108a or the endpoint 110a.

The interceptor 124 may allow to insert call test point, such as one of a test point named profiles, a test point named tokens, a test point named entitlements, and the like, at any point. Such a test point may receive the impairment instructions and simulate impairments. So, the interceptor 124 may inject network component(s) between the two points that need to be disrupted rather than changing the actual application code. The interceptor 124 may generate a response associated with the one of the service 108a or the endpoint 110a in the first session for which the fault injection is to be enabled.

The interceptor 124 may generate a response that may comprise characteristic variables pertaining to the impairment of the one of the service 108a or the endpoint 110a provided by one of the microservices 106 in the content server system 102 in the first session. The characteristic variables may comprise a template of behavioural parameters which may include at least an error message, a delay response to be received by the user 114a on the client device 112a. The characteristic variables may further comprise a plurality of connectivity characteristics which may include at least one of a network path and a call pattern.

In accordance with an embodiment, a subset of sessions, in which the fault injection instruction may be received in a subset of the production environment or the lower environment, may be impacted due to impairment based on the blast radius. In accordance with an embodiment, impairments of other services 108b, . . . , 108n or the endpoints 110b, . . . , 108n may be cascaded in addition to the impairment of the service 108a or the endpoint 110a. Each of the other services 108b, . . . , 108n or the endpoints 110b, . . . , 108n is different from the service 108a and the endpoint 110a, respectively.

In accordance with an embodiment, one or more processors, such as the processor 204, in the testing system 116 may be configured to define and persist a run time behaviour of at least one of the service 108a or the endpoint 110a based on a defined criteria. In one aspect, the defined criteria may be determined corresponding to at least a status code or a response time of the one of the service 108a or the endpoint 110a. In another aspect, the defined criteria may be determined based on an instruction set configured to control a behaviour of the testing system 116. The controlled behaviour may correspond to one of committing a change or rolling back. In yet another aspect, the defined criteria may be determined based on an exit code or data written to a file or a data structure. The exit code or the data may be consumed by the one of the service 108a or the endpoint 110a or a different service or a different endpoint. In yet another aspect, the defined criteria may be determined based on updating or overriding session state variables. In yet another aspect, the defined criteria may be determined that may correspond to one of deleting, corrupting, preventing access or hiding data that causes failure of the one of the service 108a or the endpoint 110a.

In accordance with an embodiment, one or more processors, such as the processor 204, in the testing system 116 may be further configured to test a change in behaviour of the one of the service 108a or the endpoint 110a in a simulated error state. In accordance with an embodiment, the change in the behaviour may be tested based on one or more non-persistent changes after processing the fault injection request. In accordance with an embodiment, the change in the behaviour may be further tested while preventing the processing of the fault injection request completely or partially on the basis of the simulated error state. Such embodiments may be applicable to all stateful systems.

In accordance with an embodiment, one or more processors, such as the processor 204, in the testing system 116 may be further configured to test the client device 112a or the service based on a return code. The return code may trigger and validate an expected behaviour in a client application at the client device 112a or a service called by the client application.

In accordance with an embodiment, one or more processors, such as the processor 204, in the testing system 116 may be further configured to update a configuration of injected faults for the first session. The first session may be reset at run time for the updated configuration of the injected faults for the first session.

In accordance with an embodiment, one or more processors, such as the processor 204, in the testing system 116 may be further configured to activate a kill switch for an automated impairment that is run against the fault injection request.

In accordance with an embodiment, one or more processors, such as the processor 204, in the testing system 116 may be further configured to automatically detect failures in a dashboard based on a change to a traffic pattern.

In accordance with an embodiment, one or more processors, such as the processor 204, in the testing system 116 may be further configured to generate one or more log records associated with a testing of one of the service 108a or the endpoint 110a, a date and time of the fault injection request, a date and time of the client request, and details of the response from the entity. In accordance with another embodiment, the one or more processors in the testing system 116 may be further configured to self-destruct the fault injection request after the defined timeframe.

FIG. 3 is a flowchart that illustrates exemplary operations for resiliency testing at a session level, in accordance with an exemplary embodiment of the disclosure. FIG. 3 is explained in conjunction with elements from FIG. 1 and FIG. 2. With reference to FIG. 3, there is shown a flowchart 300 that illustrates exemplary operations from 302 to 318, as described herein. The exemplary operations illustrated in the flowchart 300 may start at 302 and may be performed by any computing system, apparatus, modules, or device in the testing system 116 as described in FIG. 2. Although illustrated with discrete blocks, the exemplary operations associated with one or more blocks of the flowchart 300 may be divided into additional blocks, combined into fewer blocks, or eliminated, depending on the implementation.

The flowchart 300 is described in detail in tandem with a sequence diagram 400 illustrated in FIG. 4. FIG. 4 is a sequence diagram that illustrates sequence and dataflow operations in the testing system 116 for resiliency testing at a session level, in accordance with an exemplary embodiment of the disclosure.

At 302, a fault injection request may be received from a client device, such as the client device 112a, associated with a user, such as the user 114a. The fault injection request may define an active impairment of one of a service, such as the service 108a, or an endpoint, such as the endpoint 110a, with a blast radius restricted to a scope of the received fault injection request. The scope of the received fault injection request may correspond to a first session in a production environment or a lower environment. In accordance with an embodiment, the boundary service engine 208 may be configured to receive the fault injection request from the client device 112a associated with the user 114a. The fault injection request may be generated by the user 114a at the client device 112a, via a UI displayed on the client device 112a.

The fault injection request may define an active impairment of the one of the service 108a or the endpoint 110a with a blast radius restricted to a scope of the received fault injection request. Said differently, one of the service 108a or the endpoint 110a, provided by one of the microservices 106 in the content server system 102 at a session level, may correspond to the scope of the fault injection request. The scope of the received fault injection request may correspond to a first session in a production environment or a lower environment. In accordance with an embodiment, a subset of sessions in which the fault injection instruction is received in a subset of the production environment or the lower environment may be impacted due to the active impairment based on the blast radius. The production environment may be a setting where the latest working version of a computer program (or the service 108a or the endpoint 110a) may be installed and made available to end-users. The lower environment may be a setting in which a smaller scale model of the latest working version of the computer program (or the service 108a or the endpoint 110a) is installed and made available to some percentage of end-users.

In accordance with an embodiment, the fault injection request may include a plurality of parameters. Examples of such parameters may include, but not limited to, 'User Token,' 'Service,' 'StatusCode,' 'Delay,' and 'TTL' (optional). The parameter 'User Token' may specify a token associated with the user 114a and may be used by the developer override service engine 210 to verify an authorization of the user 114a. The parameter 'Service' may specify the service 108a or the endpoint 110a that is to be impaired. The parameter 'StatusCode' may specify a hypertext transfer protocol (HTTP) response code that may be provided to the user 114a based on the impairment of the service 108a or the endpoint 110a. The parameter 'Delay' may specify an amount of time by which one or more responses from the impaired service 108a or the endpoint 110a may be delayed. The parameter 'TTL' may correspond to time-to-live that specifies a defined timeframe after which a recovery mode of the impaired service 108a or the impaired endpoint 110a may be enabled.

Referring to the sequence diagram 400 in FIG. 4, at Time: T1, the client device 112a may transmit a fault injection request using an HTTP method in API, i.e., POST (User Token, Service, StatusCode, Delay). It should be noted that the above example should not be construed to be limiting the fault injection request to only injecting faults in services. The faults may be also injected in a service-to-service connectivity, time-out, cascading impairments across other services, independent of a change of call patterns and connectivity graph, without any deviation from the scope of the disclosure.

Such fault injection request may be received by the boundary service engine 208 of the testing system 116 in the cloud computing network 122, via the network interface 202 and the communication network 120. The boundary service engine 208 may be at the edge between the VPN of the content server system 102 and the client. The boundary service engine 208 may be configured to receive the incoming requests from the plurality of client devices 112a, . . . , 112n. So, the boundary service engine 208 may be the first service in the cloud computing network 122 which is external facing and ensures all the security checks that the fault injection requests, and the client requests are required to go through before accessing any interior service, such as the developer override service engine 210 and the interceptor 124. In accordance with an embodiment, the boundary service engine 208 may transmit the fault injection request to the developer override service engine 210 for verification purposes.

Referring to the sequence diagram 400 in FIG. 4, at Time: T2, the boundary service engine 208 may transmit the fault injection request using an HTTP method in API, i.e., POST (User Token, Service, StatusCode, Delay) to the developer override service engine 210.

At 304, it may be verified whether the user 114a is authorized to transmit the fault injection request or not. In accordance with an embodiment, the developer override service engine 210 may be configured to verify whether the user 114a is authorized to transmit the fault injection request or not. The developer override service engine 210 may verify whether the user 114a is an authorized or unauthorized user based on the fault injection request received from the boundary service engine 208. In accordance with an embodiment, the developer override service engine 210 verifies that the user 114a is an unauthorized user ineligible for generating the fault injection request. In such case, the control passes to step 306. In accordance with another embodiment, the developer override service engine 210 verifies that the user 114a is an authorized user eligible for generating the fault injection request. Accordingly, the developer override service engine 210 may identify that a session state test payload is requested by the authorized user 114a for testing a server error on the service 108a on which the fault injection is enabled. In such case, the control passes to step 308.

Referring to the sequence diagram 400 in FIG. 4, at Time: T3, the developer override service engine 210 may be configured to verify whether the user 114a is authorized to transmit the fault injection request or not.

At 306, the fault injection request may be rejected. In accordance with an embodiment, the developer override service engine 210 may be configured to reject the fault injection request generated at the client device 112a as the associated user 114a is unauthorized and thus, ineligible for generating the fault injection request. The developer override service engine 210 may generate an error message for the client device 112a indicating that the user 114a or the client device 112a is not authorized for impairing the service 108a or the endpoint 110a.

At 308, a session state test payload may be generated for the client device 112a based on the reception of the fault injection request from the authorized user 114a. In accordance with an embodiment, the developer override service engine 210 may be configured to generate the session state test payload for the client device 112a based on the reception of the fault injection request from the authorized user 114a. Based on the fault injection request received from the authorized user 114a and persistence within the blast radius, one of service 108a or the endpoint 110a may be impaired in the first session within blast radius of active impairment. The session state test payload may be requested by the authorized user 114a and generated for testing a server error on the service 108a on which fault injection is enabled.

In accordance with an embodiment, the session state test payload contains impairment instructions that correspond to an address (for example, the identifier/name of the service 108a or the endpoint 110a that the user 114a wants to impair) and a set of impairments that are desired to be applied. An example of the impairment may be: 'Make the entitlements endpoint take 2 seconds to respond but respond normally', or 'Make entitlements endpoint fail with an error code or make it fail after 2 seconds with particular code'. The impairment instructions may include, but are not limited to, a status code to be shown to the user after impairment, a delay in the responses of the service 108a or the endpoint 110a, a service-to-service connectivity for impairment, an identifier for the active impairment, an internet protocol address of the client device 112a, a time period for the active impairment, and the like.

Various non-limiting examples of session state test payload information corresponding to different services and corresponding test payload data relevant to a streaming video provider platform is depicted in the following Table 2:

TABLE 2

| Services | Fields |
| --- | --- |
| entitlements | Brand, Territory, Allowed and Upsell ChannelsStream/Download limits Ratings authority, Editorial region |
| profile | Profile ID, Adult/Child, Parental Control Settings, Editorial age group |
| globalization | Language, Format Code, Alternate UI language |
| telemetry | Home country, Session country, Access Provider details |
| privacy | Privacy consents: Disable data sharing, Allow functional cookies, Allow performance cookies, Allow targeting cookies |

In accordance with an embodiment, the session state test payload may correspond to instructions for conducting an inspection pertaining to the events in the service 108a or the endpoint 110a. In accordance with an embodiment, the session state test payload may correspond to instructions for a combined session state in which the payload has a list of instructions, for example, perform a set of steps for a service (or test point) named entitlements, perform a set of steps for another service (or test point) named profiles, and perform a set of steps for another service (or test point) named tokens, and the like. All of the aforesaid becomes part of the session state which may be attached along with every client request through internal services. In case the user 114a hits the profiles service through a few hops, the user 114a should still see profiles failing (if that's the intended behavior). Thus, for the entire session, the service 108a corresponding to profiles service should be slow irrespective of the path of the session state.

In accordance with an embodiment, the developer override service engine 210 may be further configured to generate JavaScript Object Notation (JSON) Web Token, i.e., JWT, which is an open standard used to share security related information between two parties, i.e., the client device 112a and the testing system 116 associated with the content server system 102. Each JWT may contain encoded JSON objects and is signed using a cryptographic algorithm to ensure that claims cannot be altered after the token is issued. For example, the developer override service engine 210 may generate a token that has a claim "logged in as administrator" and provide the token to the client device 112a. The client device 112a may then use the token to prove that it is logged in as admin. Each JWT may have a header, a payload, and a signature.

The JWT may be encrypted and signed to provide a level of authentication that allows to validate that the fault injection request was generated by the authorized user 114a. The developer override service engine 210 that created the JWT is entitled for creating JWTs to ensure the security mechanism so that the service 108a is not impaired by any other service randomly. The developer override service engine 210 may transmit the session state test payload and the JWT back to the boundary service engine 208.

Referring to the sequence diagram 400 in FIG. 4, at Time: T4, the developer override service engine 210 may be configured to transmit the generated session state test payload and the JWT for the client session for the client device 112a based on the reception of the fault injection request from the authorized user 114a.

At 310, the session state test payload may be encrypted for a first session based on the fault injection request. In accordance with an embodiment, the boundary service engine 208 may be configured to encrypt the session state test payload for the first session based on the fault injection request. As the encryption of the session state test payload may be an optional step, the control may pass to step 312 directly from step 308. Examples of the one or more encryption algorithms may include, but are not limited to, a data encryption standard (DES), a triple DES, an advanced encryption standard (AES), a Rivest-Shamir-Adleman (RSA) algorithm, a Blowfish algorithm, a Twofish algorithm, and the like.

Thus, the boundary service engine 208 may function as a checkpoint where a response, which is sensitive, going outside the testing system 116 in the cloud computing network 122 is encrypted, and a request being received from the client device 112a is decrypted, which is validated beyond that.

At 312, the session state test payload may be transmitted to the client device 112a based on the fault injection request. In accordance with an embodiment, the boundary service engine 208 may be configured to transmit the session state test payload to the client device 112a based on the fault injection request. Along with the session state test payload, the JWT may also be attached.

Referring to the sequence diagram 400 in FIG. 4, at Time: T5, the boundary service engine 208 may be configured to transmit the encrypted session state test payload and the JWT to the client device 112a.

At 314, a client request may be received from the client device 112a within the blast radius of the active impairment. In accordance with an embodiment, the boundary service engine 208 may be configured to receive the client request from the client device 112a within the blast radius of the active impairment. The client request may include the encrypted session state test payload in the header of the client request. The client request may correspond to a call for the service 108a or the endpoint 110a provided by the content server system 102.

When the boundary service engine 208 receives the client request, the boundary service engine 208 may decode the client request and verify whether the client request is valid. If the client request is valid, it corresponds to the session state, which is further forwarded to the rest of the internal services. So, the boundary service engine 208 may facilitate to create a secure validated session state mechanism which may be implemented at the boundary of the cloud computing network 122. The internal services that receive the validated data may not be concerned about the signature and tokens.

The service 108a or the endpoint 110a called using the session state test payload included in the client request is impaired, thus, the service 108a or the endpoint 110a may be down for the time mentioned in the delay field of the fault injection request or shown the HTTP response code that may be mentioned in the instructions of the session state payload.

Referring to the sequence diagram 400 in FIG. 4, at Time: T6, the boundary service engine 208 may be configured to receive the client request from the client device 112a within the blast radius of the active impairment.

At 316, a response received from an entity associated with one of the service 108a or the endpoint 110a may be transmitted to the client device 112a. The response may include the characteristic variables pertaining to impairment of one of the service 108a or the endpoint 110a in first session. In accordance with an embodiment, the interceptor 124 may be configured to transmit the response associated with one of the service 108a or the endpoint 110a to the client device 112a.

In accordance with an embodiment, the interceptor 124 may be configured to receive the client request associated with one of the service 108a or the endpoint 110a from the boundary service engine 208. The boundary service engine 208 may transmit the request to the interceptor 124 using an HTTP method in API, i.e., GET Request with attached session state payload in header.

The entity may correspond to one of a service container (such as a sidecar container), a middleware, an integrated device or module, a separate service to hijack and pre-process the fault injection request and the client request, or a central repository utilized by the one of the service 108a or the endpoint 110a. The entity may correspond to a hardware or a software that may be configured to manage communication of the service 108a or the endpoint 110a with the client device 112a or other services that may be associated with the service 108a.

Referring to the sequence diagram 400 in FIG. 4, at Time: T7, the boundary service engine 208 may be configured to transmit the request to the interceptor 124 using an HTTP method in API, i.e., GET Request with attached session state payload in header.

In accordance with an embodiment, the interceptor 124 may be attached to any interior service for which the fault injection is desired to be enabled. The interceptor 124 may run in a separate container which may allow to insert call test point essentially at any point. At such test points, impairment instructions may be received, and impairments may be simulated. So, using the interceptor 124, rather than changing the actual application code, only network component is inserted between the two points that is required to be disrupted.

In accordance with an embodiment, the interceptor 124 may perform interception at the network level. So, when a call goes from one service to another service, an additional call may be inserted between the two services that may inspect all of the requests and decide which ones need to be impaired. Accordingly, the session-based fault injection instructions may be generated.

In accordance with an embodiment, the interceptor 124 may generate a response for the received client request. The response may include characteristic variables. The characteristic variables may pertain to the impairment of the one of the service 108a or the endpoint 110a in the first session for the client request. The characteristic variables may include a template of behavioural parameters, such as, but not limited to, an error (such as the HTTP response code) or a delay response (where responses are delayed by a certain time period) to be received by the user 114a. In accordance with another embodiment, the characteristic variables may include a plurality of connectivity characteristics may include a network path and/or call pattern.

Referring to the sequence diagram 400 in FIG. 4, at Time: T8, the interceptor 124 may transmit the response to the boundary service engine 208. At time: T9, the boundary service engine 208 may further transmit the response to the client device 112*a* via the communication network 120.

At 318, one or more log records associated with testing of one of service 108*a* or endpoint 110*a*, a date and time of fault injection request, a date and time of client request, and details of response from the entity may be generated. In accordance with an embodiment, the processor 204 may be configured to generate one or more log records associated with testing of one of service 108*a* or endpoint 110*a*, a date and time of fault injection request, a date and time of client request, and details of response from the entity.

The generated one or more log records may be further analysed by the user 114*a* to enhance the service 108*a* or the endpoint 110*a* to improve an end-user experience. Therefore, the processor 204 may provide audit capabilities to log records for improving the service 108*a* or the endpoint 110*a*.

In accordance with an embodiment, impairments of other services, such as the services 108*b*, ..., 108*n* or the endpoints 110*b*, ..., 110*n* may be cascaded in addition to the impairment of the service 108*a* or the endpoint 110*a*. It may be noted that each of the services 108*b*, ..., 108*n* or the endpoints 110*b*, ..., 110*n* is different from the service 108*a* or the endpoint 110*a*, respectively. Such an embodiment is described in detail in FIGS. 5A and 5B.

In accordance with an embodiment, the client device 112*a* may be configured to inject one or more faults in a service-to-service connectivity. Similarly, the client device 112*a* may inject one or more faults in time-out and cascading impairments across other services, independent of a change of call patterns and connectivity graph.

In accordance with an embodiment, a run time behaviour of at least one of the service 108*a* or the endpoint 110*a* may be defined and persisted based on a defined criteria. In one example, the defined criteria may be determined corresponding to at least a status code or a response time of the one of the service 108*a* or the endpoint 110*a*. In another example, the defined criteria may be determined based on an instruction set that may be configured to control a behaviour of the content server system 102. The controlled behaviour corresponds to one of committing a change or rolling back the change. In yet another example, the defined criteria may be determined based on an exit code or data written to a file or a data structure. The exit code or the data may be consumed by the one of the service 108*a* or the endpoint 110*a* or a different service or a different endpoint. In another example, the defined criteria may be determined based on updating or overriding session state variables. In another example, the defined criteria may be determined based on one of deleting, corrupting, preventing access or hiding data that causes failure of the one of the service 108*a* or the endpoint 110*a*.

In accordance with an embodiment, the testing system 116 may be further configured to test a change in behaviour of the one of the service 108*a* or the endpoint 110*a* in a simulated error state. In accordance with an embodiment, the change in the behaviour may be tested based on one or more non-persistent changes after processing the fault injection request. In accordance with an embodiment, the change in the behaviour may be further tested while preventing the processing of the fault injection request completely or partially on the basis of the simulated error state. Such change in the behaviour of the one of the service 108*a* or the endpoint 110*a* may be further used to improve the service 108*a* or the endpoint 110*a*. Such embodiments may be applicable to all stateful systems.

In accordance with another embodiment, the testing system 116 may be configured to test the client device 112*a* or the service based on a return code. The return code may trigger and validate an expected behaviour in a client application at the client device 112*a* or the service that may be called by the client application.

In accordance with another embodiment, the testing system 116 may be configured to update a configuration of injected faults for the first session. The testing system 116 may be further configured to reset the first session at run time for the updated configuration of the injected faults for the first session.

In accordance with another embodiment, the testing system 116 may be configured to activate a kill switch for an automated impairment that is run against the fault injection request. Such kill switches may be activated to prevent triggering circuit breakers. Such circuit breakers may correspond to design patterns that may prevent the service 108*a* or the endpoint 110*a* from performing an operation that is likely to fail.

In accordance with another embodiment, the testing system 116 may be configured to determine and save traffic pattern associated with the service 108*a* or the endpoint 110*a*. The testing system 116 may be further configured to analyse the saved traffic pattern and automatically detect failures in a dashboard based on a change to the traffic pattern. In accordance with an embodiment, the fault injection request may include the TTL field to specify a defined timeframe after which a recovery mode is enabled. The testing system 116 may be configured to self-destruct the fault injection request after the defined timeframe.

FIG. 5A is a first sequence and dataflow diagram that depicts an exemplary use case of cascading failures and testing client application, in accordance with an exemplary embodiment of the disclosure. FIG. 5A is explained in conjunction with elements from FIG. 1 to FIG. 4. The first sequence and dataflow diagram 500A may correspond to a regular test for testing a slow downstream service or resource that may result in cascading failures.

With reference to FIG. 5A, there is shown the first sequence and dataflow diagram 500A that may include multiple client devices, such as the client device 112*a* associated with the user 114*a* and another client device 112*b* associated with the user 114*b*, a first service, such as the service 108*a*, and a second service, such as another service 108*b*. The first service, i.e., the service 108*a*, may be dependent on the second service, i.e., the other service 108*b*.

Due to aggressive testing by the second user, i.e., the other user 114*b*, the second service, i.e., the other service 108*b*, may become completely unresponsive and may hold multiple open connections to the first service, i.e., the service 108*a*. Due to multiple open connections between the first service, i.e., the service 108*a*, and the second service, i.e., the other service 108*b*, the first service may be slowed down. Further, the first user, i.e., the user 114*a*, (and/or the second user, i.e., the other user 114*b*) may not be able to reach the second service, i.e., the other service 108*b*, through the first service, i.e., the service 108*a*.

In a scenario, the second user, i.e., the other user 114*b*, may keep retrying to call the first service, i.e., the service 108*a*, as indicated by S1. Due to dependency, the first service, i.e., the service 108*a*, may further keep retrying to call the second service, i.e., the other service 108*b*, as indicated by S2. However, as indicated by S3, the result may be cascaded failures.

In another scenario, as indicated by S4, the first user, i.e., the user 114a, may try to call the first service, i.e., the service 108a, only. However, as indicated by S5, the result may be again a failure.

FIG. 5B is a second sequence and dataflow diagram that depicts exemplary sequence and dataflow operations for resiliency testing at a session level in case of cascading failures, in accordance with an exemplary embodiment of the disclosure. FIG. 5B is explained in conjunction with elements from FIG. 1 to FIG. 4, and FIG. 5A. With reference to FIG. 5B, there is shown the second sequence and dataflow diagram 500B and may include multiple client devices, such as the client device 112a associated with the user 114a and another client device 112b associated with the other user 114b, a first service, such as the service 108a, and a second service, such as another service 108b, as illustrated in FIG. 5A. Additionally, FIG. 5B includes the testing system 116 configured to perform resiliency testing at a session level.

In accordance with an embodiment, the second user, i.e., the other user 114b, may generate a fault injection request for delaying the second service, i.e., the other service 108b, with a predefined value, such as '5000'. The fault injection request may define the active impairment of the second service, i.e., the other service 108b, with a blast radius restricted to a scope of the received fault injection request. The scope of the received fault injection request may correspond to a first session. As an example, the fault injection request may be "impair: Second Service delay: 5000", because of which the second service, such as another service 108b, may be impaired for the client device 112b associated with the other user 114b for 5000 milliseconds.

The fault injection request may be transmitted to the boundary service engine 208 (not shown in FIG. 5B) of the testing system 116, as indicated by S11. The boundary service engine 208 may communicate the fault injection request to the developer override service engine 210 (not shown in FIG. 5B) in the testing system 116. The developer override service engine 210 may verify and authorize the second user, i.e., the other user 114b, to invoke the functionality of resiliency testing of the second service, i.e., the other service 108b.

Accordingly, the developer override service engine 210 may generate a session state test payload for the client device 112b associated with the authorized user 114b. The session state test payload may include impairment instructions. The developer override service engine 210 may communicate the session state test payload to the boundary service engine 208. In turn, the boundary service engine 208 may encrypt the session state test payload and transmit the encrypted session state test payload to the client device 112b, via the communication network 120, as indicated by S12.

The client device 112b may receive the session state test payload from the testing system 116 and the second user, i.e., the other user 114b, may subsequently transmit a client request to the first service, i.e., the service 108a, with the attached session state test payload, as indicated by S13. As the first service, i.e., the service 108a, is dependent on the second service, i.e., the other service 108b, a call is initiated from the first service, i.e., the service 108a, to the second service, i.e., the other service 108b, as indicated by S14.

As the second service, i.e., the other service 108b, is impaired to delay the responses by 5000 milliseconds, the entity (such as a second instance of the interceptor 124, i.e., a second interceptor 124b) associated with the second service, i.e., the other service 108b, may generate a response after 5000 milliseconds for the second user, i.e., the other user 114b, as indicated by S15.

Meanwhile, the entity (such as a first instance of the interceptor 124, i.e., a first interceptor 124a) associated with the first service, i.e., the service 108a, may generate a failure response due to time out as the second service, i.e., the other service 108b, is impaired to delay the responses, as indicated by S16.

In another scenario, the first user, i.e., the user 114a, may wish to access the first service, i.e., the service 108a, while the second service, i.e., the other service 108b, is still impaired. In such scenario, the first user, i.e., the user 114a, may be able to normally access the first service, i.e., the service 108a, as indicated by S17, that may further call the second service, i.e., the other service 108b, as indicated by S18. The second service, i.e., the other service 108b, may provide a response to the first service, i.e., the service 108a, as indicated by S19. In turn, the first service, i.e., the service 108a, may provide a service response to the client device 112a, as indicated by S20.

Thus, the active impairment of the second service, i.e., the other service 108b, is associated with a first session for the second user, i.e., the other user 114b, only. Consequently, the first user, i.e., the user 114a, may be able to normally access the second service, i.e., the other service 108b and may not observe the cascaded failure.

FIG. 6 is a third sequence and dataflow diagram that depicts an exemplary use case of retaining of impairment for all the calls in a session, in accordance with an exemplary embodiment of the disclosure. FIG. 6 is explained in conjunction with elements from FIG. 1 to FIG. 4. With reference to FIG. 6, there is shown a third sequence and dataflow diagram 600 that may include a first user, i.e., the user 114a, associated with the client device 112a, a first service, i.e., the service 108a, a second service, i.e., the other service 108b, and a third service, i.e., another service 108c.

In accordance with an embodiment, the client device 112a associated with the first user, i.e., the user 114a, may transmit a fault injection request to the testing system 116 for impairing the first service, i.e., the service 108a, the second service, i.e., the other service 108b, and the third service, i.e., other service 108c. The impairment instruction in the generated session state test payload may be reused on the same devices repeatedly until expiration time (for example, 5 min). So, during the 5 min testing period, the impairment is retained. To recreate the impairment, the user 114a may be required to generate the fault injection request through input UI.

The impairment instructions may include one or multiple instructions. For example, for the first service, i.e., the service 108a, and the third service, i.e., other service 108c, to display error code of "500" may correspond to "Internal Server Error". Further, the impairment instructions may include instructions for the second service, i.e., the other service 108b, to delay the responses by 5000 milliseconds. The third service, i.e., the other service 108c, may have a dependency on the second service, i.e., the other service 108b.

Upon receiving the fault injection request, the testing system 116 may generate a session state test payload that may be encrypted and transmitted back to the client device 112a. An exemplary session state test payload may appear as follows:

```
{
    payloads: {
        test: {
            expiration: "5 min",
            actions: [
                {
                    action: "impair",
                    testpoint: "First service",
                    status: 500
                },
                {
                    action: "impair",
                    testpoint: "Second Service",
                    delay: 5000
                },
                {
                    action: "impair",
                    testpoint: "Third Service",
                    status: 500,
                    callers: ["second service"]
                },
            ]
        }
    }
}
```

Based on the reception of the session state payload, the client device 112a associated with the user 114a may generate a first client request to call the first service, i.e., the service 108a. The client request may be attached with the session state test payload. At time T1, the client device 112a may transmit the first client request to call the first service, i.e., the service 108a, as indicated by S21. Based on the reception of the first client request by the first service, i.e., the service 108a, (or the sidecar (or container) associated with the first service, i.e., the service 108a), the first service may be impaired to show an error code of "500" by the first instance of the interceptor 124, i.e., the first interceptor 124a, as indicated by S22, as the first service, i.e., the service 108a, is in downtime.

At time T2, the client device 112a may transmit a second client request to call the second service, i.e., the service 108b, as indicated by S23. Based on the reception of the second client request by the second service, i.e., the service 108b, (or the sidecar (or container) associated with the second service, i.e., the service 108b), the second service, i.e., the service 108b, may be impaired by the second instance of the interceptor 124, i.e., the second interceptor 124b, to delay the responses to be provided by the second service, i.e., the service 108b, by 5000 milliseconds, as indicated by S24. Further, the second service, i.e., the service 108b, may call the third service, i.e., the service 108c, (as the second service is dependent on the third service) and transmit the session state test payload to the third service, i.e., the service 108c, as indicated by S25. Based on the reception of the session state test payload by the third service, i.e., the service 108c, (or the container associated with the third service), the third service, i.e., the service 108c, may also be impaired to show an error code of "500" by a third instance of the interceptor 124, i.e., a third interceptor 124c, as indicated by S26, as the connection from the second service, i.e., the service 108b, to the third service, i.e., the service 108c, is down.

At time T3, the client device 112a may transmit the third client request to call the third service, i.e., the service 108c, as indicated by S27. Based on the reception of the third client request by the third service, i.e., the service 108c, (or the sidecar (or container) associated with the third service, i.e., the service 108c), the third service, i.e., the service 108c, may return the requested services, as indicated by S28. It should be noted that the third service, i.e., the service 108c, is not impaired and thus, does not generate the error code as the third request is received directly from the client device 112a associated with the first user, i.e., the user 114a.

FIG. 7 is a fourth sequence and dataflow diagram that depicts an exemplary use case of self-destruction of fault injection request, in accordance with an exemplary embodiment of the disclosure. FIG. 7 is explained in conjunction with elements from FIG. 1 to FIG. 4. With reference to FIG. 7, there is shown a fourth sequence and dataflow diagram 700 that may include the user 114a, the testing system 116, and the first service, i.e., the service 108a.

The user 114a may generate a self-destruction fault injection request for impairing the first service, i.e., the service 108a, and showing an error code: 500. The self-destruction fault injection request may define the active impairment of the first service, i.e., the service 108a, with a blast radius restricted to a scope of the received fault injection request. The scope of the received self-destruction fault injection request may correspond to a first session. As an example, the self-destruction fault injection request may be "impair: First Service StatusCode: 500 TTL: 5 s". The TTL filed may specify a defined timeframe, for example 5 s, after which a recovery mode may be enabled (or the self-destruction fault injection request may be self-destroyed).

As indicated by S31, the self-destruction fault injection request may be transmitted to the boundary service engine 208 (not shown in FIG. 7) of the testing system 116. The boundary service engine 208 may communicate the self-destruction fault injection request to the developer override service engine 210 (not shown in FIG. 7) in the testing system 116. The developer override service engine 210 may verify and authorize the user 114a to invoke the functionality of resiliency testing of the first service, i.e., the service 108a.

Accordingly, the developer override service engine 210 may generate a session state test payload for the client device 112a associated with the authorized user 114a. The session state test payload may include impairment instructions. The developer override service engine 210 may communicate the session state test payload to the boundary service engine 208. In turn, the boundary service engine 208 may encrypt the session state test payload and transmit the encrypted session state test payload to the client device 112a, via the communication network 120, as indicated by S32.

The client device 112a may receive the session state test payload from the testing system 116 and the user 114a may transmit a client request to the first service, i.e., the service 108a, with the attached session state test payload, as indicated by S33.

An entity (i.e., the interceptor 124 (not shown in FIG. 7)) associated with the first service, i.e., the service 108a, may process the session state test payload and as the impairment of the first service, i.e., the service 108a, is active, an error response may be generated by the interceptor 124 and transmitted to the client device 112a, as indicated by S34. An additional message, for example "Call impaired" may also be transmitted to the client device 112a for clarity.

Once the TTL expires at time T2, i.e., after 5 s, the user 114a may again transmit a subsequent client request to the first service, i.e., the service 108a, with the attached session state test payload, as indicated by S35. In this case, the entity (i.e., the interceptor 124 (not shown in FIG. 7)) associated with the first service, i.e., the service 108a, may process the session state test payload and determine that the TTL has already expired and the impairment of the first service, i.e., the service 108a, is not active anymore. Accordingly, the impairment may be ignored and a response for the requested first service, i.e., the service 108a, with service code may be generated and transmitted to the client device 112a, as indicated by S36.

FIG. 8 is a conceptual diagram illustrating an example of a hardware implementation for the testing system 116 of FIG. 2 employing a processing system, in accordance with an exemplary embodiment of the disclosure. Referring to FIG. 8, the hardware implementation shown by a representation 800 for the testing system 116 employs a processing system 802, in accordance with an exemplary embodiment of the disclosure, as described herein.

In some examples, the processing system 802 may comprise one or more hardware processors, such as a hardware processor 804, a non-transitory computer readable medium 806, a bus 808, a bus interface 810, and a transceiver 812. FIG. 8 further illustrates the network interface 202, the processor 204, the memory 206, the boundary service engine 208, the developer override service engine 210, and the payload configuration and policy service engine 214 (that further includes the client payload data service engine 216, the rules engine 218, and the policy engine 220) as described in detail in FIG. 2.

The hardware processor 804 may be configured to execute or implement software, hardware, and/or firmware modules and manage the bus 808 and general processing, including the execution of a set of instructions stored on the non-transitory computer readable medium 806. The set of instructions, when executed by the hardware processor 804, causes the testing system 116 to execute the various operations described herein for any particular apparatus. The hardware processor 804 may be implemented, based on a number of processor technologies known in the art. Examples of the hardware processor 804 may be a RISC processor, an ASIC processor, a CISC processor, and/or other processors or control circuits. In accordance with various embodiment, the hardware processor 804 may include a single or multiple set of processors or multi-core processors. Moreover, the hardware processor 804 may be implemented as an integrated processing system and/or a distributed processing system in the cloud computing network 122.

The non-transitory computer readable medium 806 may be used for storing data that is manipulated by the hardware processor 804 when executing the set of instructions. The data is stored for short periods or in the presence of power. The non-transitory computer readable medium 806 may also be configured to store data for the network interface 202, the processor 204, the memory 206, the boundary service engine 208, the developer override service engine 210, and the payload configuration and policy service engine 214 (that further includes the client payload data service engine 216, the rules engine 218, and the policy engine 220), as described in detail in FIG. 2.

As described above, the memory 206 may store local versions of applications being executed by the hardware processor 804, related instructions and corresponding parameters. The memory 206 may include a type of memory usable by a computer, such as RAM, ROM, tapes, magnetic discs, optical discs, volatile memory, non-volatile memory, and any combination thereof. Additionally, the hardware processor 804 and the memory 206 may include and execute an operating system executing on the hardware processor 804, one or more applications and display drivers and/or other components.

The bus 808 is configured to link together various circuits. In this example, the testing system 116 employing the processing system 802, the hardware processor 804, the non-transitory computer readable medium 806, and the memory 206 may be implemented with bus architecture, represented by bus 808. The bus 808 may include any number of interconnecting buses and bridges depending on the specific implementation of the testing system 116 and the overall design constraints. The bus interface 810 may be configured to provide an interface between the bus 808 and other circuits, such as, the transceiver 812.

The transceiver 812 may be configured to provide a communication of the testing system 116 with various other external systems. The transceiver 812 may communicate via wireless communication with networks, such as the Internet, the Intranet and/or a wireless network, such as a cellular telephone network, WLAN and/or a MAN. The wireless communication may use any of a plurality of communication standards, protocols, and technologies, such as GSM, Enhanced Data GSM Environment (EDGE), LTE, wideband code division multiple access (W-CDMA), CDMA, time division multiple access (TDMA), Bluetooth®, Wi-Fi (such as IEEE 802.11a, IEEE 802.11b, IEEE 802.11g and/or IEEE 802.11n), voice over Internet Protocol (VoIP), and/or Wi-MAX. In accordance with an embodiment, the transceiver 812 may provide for establishing and maintaining communications, such as UWB communications, with one or more other devices, parties, entities, and the like, utilizing hardware, software, and services. For example, the transceiver 812 may provide for establishing and maintaining the short- or long-range communication protocols.

It should be recognized that, in some embodiments of the disclosure, one or more components of FIG. 8 may include software whose corresponding code may be executed by at least one processor, across multiple processing environments. For example, the network interface 202, the processor 204, the memory 206, the boundary service engine 208, the developer override service engine 210, and the payload configuration and policy service engine 214 (that further includes the client payload data service engine 216, the rules engine 218, and the policy engine 220) may include software that may be executed across a single or multiple processing environments.

In an aspect of the disclosure, the hardware processor 804, the non-transitory computer readable medium 806, or a combination of both may be configured or otherwise specially programmed to execute the operations or functionality of the network interface 202, the processor 204, the memory 206, the boundary service engine 208, the developer override service engine 210, and the payload configuration and policy service engine 214 (that further includes the client payload data service engine 216, the rules engine 218, and the policy engine 220), or various other components described herein, as described with respect to FIG. 2.

FIG. 9 is a conceptual diagram illustrating an example of a hardware implementation for the content server system 102 of FIG. 1 employing a processing system, in accordance with an exemplary embodiment of the disclosure. Referring to FIG. 9, the hardware implementation shown by a representation 900 for the content server system 102 employs a processing system 902, in accordance with an exemplary embodiment of the disclosure, as described herein.

In some examples, the processing system 902 may comprise one or more hardware processors, such as a hardware processor 904, a non-transitory computer readable medium 906, a memory 908, a bus 910, a bus interface 912, and a transceiver 914. FIG. 9 further illustrates the API gateway 104, the microservices 106, the plurality of services 108a, ..., 108n, the plurality of endpoints 110a, ..., 110n, and the interceptor 124, described in detail in FIG. 1.

The hardware processor 904 may be configured to execute or implement software, hardware, and/or firmware modules and manage the bus 910 and general processing, including the execution of a set of instructions stored on the non-transitory computer readable medium 906. The set of instructions, when executed by the hardware processor 904, causes the content server system 102 to execute the various operations described herein for any particular apparatus. The hardware processor 904 may be implemented, based on a number of processor technologies known in the art. Examples of the hardware processor 904 may be a RISC processor, an ASIC processor, a CISC processor, and/or other processors or control circuits. In accordance with various embodiment, the hardware processor 904 may include a single or multiple set of processors or multi-core processors. Moreover, the hardware processor 904 may be implemented as an integrated processing system and/or a distributed processing system in the cloud computing network 122.

The non-transitory computer readable medium 906 may be used for storing data that is manipulated by the hardware processor 904 when executing the set of instructions. The data is stored for short periods or in the presence of power. The non-transitory computer readable medium 906 may also be configured to store data for the API gateway 104, the microservices 106, the plurality of services 108a, ..., 108n, the plurality of endpoints 110a, ..., 110n, and the interceptor 124, as described in detail in FIG. 1.

As described above, the memory 908 may store local versions of applications being executed by the hardware processor 904, related instructions and corresponding parameters. The memory 908 may include a type of memory usable by a computer, such as RAM, ROM, tapes, magnetic discs, optical discs, volatile memory, non-volatile memory, and any combination thereof. Additionally, the hardware processor 904 and the memory 908 may include and execute an operating system executing on the hardware processor 904, one or more applications and display drivers and/or other components.

The bus 910 is configured to link together various circuits. In this example, the content server system 102 employing the processing system 902, the hardware processor 904, the non-transitory computer readable medium 906, and the memory 908 may be implemented with bus architecture, represented by bus 910. The bus 910 may include any number of interconnecting buses and bridges depending on the specific implementation of the content server system 102 and the overall design constraints. The bus interface 912 may be configured to provide an interface between the bus 910 and other circuits, such as, the transceiver 914.

The transceiver 914 may be configured to provide a communication of the content server system 102 with various other external systems. The transceiver 914 may communicate via wireless communication with networks, such as the Internet, the Intranet and/or a wireless network, such as a cellular telephone network, WLAN and/or a MAN. The wireless communication may use any of a plurality of communication standards, protocols, and technologies, such as GSM, Enhanced Data GSM Environment (EDGE), LTE, wideband code division multiple access (W-CDMA), CDMA, time division multiple access (TDMA), Bluetooth®, Wi-Fi (such as IEEE 802.11a, IEEE 802.11b, IEEE 802.11g and/or IEEE 802.11n), voice over Internet Protocol (VoIP), and/or Wi-MAX. In accordance with an embodiment, the transceiver 914 may provide for establishing and maintaining communications, such as UWB communications, with one or more other devices, parties, entities, and the like, utilizing hardware, software, and services. For example, the transceiver 914 may provide for establishing and maintaining the short- or long-range communication protocols.

It should be recognized that, in some embodiments of the disclosure, one or more components of FIG. 9 may include software whose corresponding code may be executed by at least one processor, across multiple processing environments. For example, the API gateway 104, the microservices 106, the plurality of services 108a, ..., 108n, the plurality of endpoints 110a, ..., 110n, and the interceptor 124 may include software that may be executed across a single or multiple processing environments.

It should be recognized that, in some embodiments of the disclosure, one or more components of FIG. 9 may include software whose corresponding code may be executed by at least one processor, across multiple processing environments. For example, the API gateway 104, the microservices 106, the plurality of services 108a, ..., 108n, the plurality of endpoints 110a, ..., 110n, and the interceptor 124 may include software that may be executed across a single or multiple processing environments.

In an aspect of the disclosure, the hardware processor 904, the non-transitory computer readable medium 906, or a combination of both may be configured or otherwise specially programmed to execute the operations or functionality of the API gateway 104, the microservices 106, the plurality of services 108a, ..., 108n, the plurality of endpoints 110a, ..., 110n, and the interceptor 124, or various other components described herein, as described with respect to FIG. 1.

Various embodiments of the disclosure comprise the testing system 116 that may be configured for resiliency testing at a session level. The testing system 116 may comprise, for example, the network interface 202, the processor 204, the memory 206, the boundary service engine 208, the developer override service engine 210, and the payload configuration and policy service engine 214 (that further includes the client payload data service engine 216, the rules engine 218, and the policy engine 220). The memory 206 of the testing system 116 may be configured to store instructions and the processor 204 may be configured to execute the instructions, and based on the executed instructions, the boundary service engine 208 may be configured to receive a fault injection request from a client device, such as the client device 112a, associated with a user, such as the user 114a. The fault injection request may define an active impairment of one of a service, such as the service 108a, or an endpoint, such as the endpoint 110a, with a blast radius restricted to a scope of the received fault injection request. The scope of the received fault injection request may correspond to a first session in a production environment or a lower environment. The boundary service engine 208 may be further configured to receive, from the client device 112a, a client request within the blast radius of the active impairment. Based on the fault injection request and a persistence within the blast radius, the one of the service 108a or the endpoint 110a is impaired in the first session. The boundary service engine 208 may be further configured to transmit, to the client device 112a, a response received from an entity, such as the interceptor 124, associated with the one of the service 108a or the endpoint 110a. The response may comprise characteristic variables pertaining to the impairment of the one of the service 108a or the endpoint 110a in the first session.

In accordance with an embodiment of the disclosure, the boundary service engine 208 may be further configured to encrypt a session state test payload for the first session based on the fault injection request. The session state test payload may include impairment instructions.

In accordance with an embodiment of the disclosure, a subset of sessions in which a fault injection instruction is received in a subset of the production environment, or the lower environment may be impacted due to the active impairment based on the blast radius.

In accordance with an embodiment of the disclosure, one of the service 108a or the endpoint 110a may correspond to the scope of the fault injection request.

In accordance with an embodiment of the disclosure, the characteristic variables may include a template of behavioral parameters. The template of behavioral parameters may further include an error message or a delay response to be received by the user 114a on the client device 112a.

In accordance with an embodiment of the disclosure, the characteristic variables may comprise a plurality of connectivity characteristics. The plurality of connectivity characteristics comprises at least one of a network path and a call pattern.

In accordance with an embodiment of the disclosure, the impairments of other services or endpoints are cascaded in addition to the impairment of the service 108a or the endpoint 110a. Each of the other services or endpoints is different from the service 108a or the endpoint 110a.

In accordance with an embodiment of the disclosure, the fault injection request may correspond to one of a service-to-service connectivity, time-out, cascading impairments across other services, independent of a change of call patterns and connectivity graph.

In accordance with an embodiment of the disclosure, the processor 204 may be configured to define and persist a run time behavior of at least one of the service 108a or the endpoint 110a based on a defined criteria.

In accordance with an embodiment of the disclosure, the processor 204 may be further configured to determine the defined criteria corresponding to at least a status code or a response time of the one of the service 108a or the endpoint 110a.

In accordance with an embodiment of the disclosure, the processor 204 may be further configured to determine the defined criteria based on an instruction set configured to control a behavior of the system. The controlled behavior may correspond to one of committing a change or rolling back.

In accordance with an embodiment of the disclosure, the processor 204 may be further configured to determine the defined criteria based on an exit code or data written to a file or a data structure. The exit code or the data may be consumed by the one of the service 108a or the endpoint 110a or a different service or a different endpoint.

In accordance with an embodiment of the disclosure, the processor 204 may be further configured to determine the defined criteria based on updating or overriding session state variables.

In accordance with an embodiment of the disclosure, the processor 204 may be further configured to determine the defined criteria that corresponds to one of deleting, corrupting, preventing access or hiding data that causes failure of the one of the service 108a or the endpoint 110a.

In accordance with an embodiment of the disclosure, the entity may correspond to one of a service container, a middleware, an integrated device or module, a separate service to hijack and pre-process the fault injection request and the client request, or a central repository utilized by the one of the service 108a or the endpoint 110a.

In accordance with an embodiment of the disclosure, the processor 204 may be further configured to test a change in behavior of the one of the service 108a or the endpoint 110a in a simulated error state based on one or more non-persistent changes after processing the fault injection request or prevention from processing the fault injection request completely or partially based on the simulated error state.

In accordance with an embodiment of the disclosure, the processor 204 may be further configured to test the client device 112a or the service 108a based on a return code. The return code may trigger and validate an expected behavior in a client application at the client device 112a or the service called by the client application.

In accordance with an embodiment of the disclosure, the processor 204 may be further configured to update a configuration of injected faults for the first session and reset the first session at run time for the updated configuration of the injected faults for the first session.

In accordance with an embodiment of the disclosure, the processor 204 may be further configured to activate a kill switch for an automated impairment that may run against the fault injection request.

In accordance with an embodiment of the disclosure, the processor 204 may be further configured to automatically detect failures in a dashboard based on a change to a traffic pattern.

In accordance with an embodiment of the disclosure, the processor 204 may be further configured to generate one or more log records associated with a testing of one of the service or the endpoint, a date and time of the fault injection request, a date and time of the client request, and details of the response from the entity.

In accordance with an embodiment of the disclosure, the fault injection request may include the TTL field to specify a defined timeframe after which a recovery mode is enabled.

In accordance with an embodiment of the disclosure, the processor 204 may be further configured to self-destruct the fault injection request after the defined timeframe.

Various embodiments of the disclosure may provide a computer-readable medium (such as the non-transitory computer readable medium 806) and/or storage medium (such as the memory 206) having stored thereon, computer implemented instructions that when executed by the hardware processor 804 causes the testing system 116 to execute operations for resiliency testing at a session level. In accordance with an embodiment, the processor 204 causes the testing system 116 to execute operations which includes receiving a fault injection request from a client device, such as the client device 112a, associated with a user, such as the user 114a. The fault injection request may define an active impairment of one of a service, such as the service 108a, or an endpoint, such as the endpoint 110a, with a blast radius restricted to a scope of the received fault injection request. The scope of the received fault injection request may correspond to a first session in a production environment or a lower environment. The processor 204 causes the testing system 116 to execute operations which includes receiving, from the client device 112a, a client request within the blast radius of the active impairment. Based on the fault injection request and a persistence within the blast radius, the one of the service 108a or the endpoint 110a is impaired in the first session. The processor 204 causes the testing system 116 to execute operations which includes transmitting, to the client device 112a, a response received from an entity, such as the interceptor 124, associated with the one of the service 108a or the endpoint 110a. The response may comprise characteristic variables pertaining to the impairment of the one of the service 108a or the endpoint 110a in the first session.

The testing system 116 may provide various advantages over the existing systems. For example, existing testing systems are deficient of appropriate tools for testing resiliency that eventually accentuates high barrier for such testing. To an extent, the existing testing systems address this challenge by having detailed schedules and plans for coordination among the different teams and to have periodic resiliency testing exercises. However, as numerous mitigations are built to improve resiliency in various parts of the system, testing in a single environment becomes the bottleneck, if every testing involves failing some service in such environment. Consequently, the environment may become unusable to others during the time when testing is being performed, thereby defeating the overall purpose of resiliency.

To overcome such challenge and the others as described above, the testing system 116, as proposed in the present disclosure, may leverage an efficient and robust tool. Such a tool may empower a user by reducing the need for coordinated testing and thus facilitating test failures without impacting other users and client devices in the environment. The testing system 116, as proposed in the present disclosure, is useful to any service that experiences highly unpredictable levels of traffic as part of their regular operations or on specific days.

The testing system 116, as proposed in the present disclosure, may be quite valuable for the content server system 102 whose traffic patterns contain events that are hard to simulate and test using normal operations without affecting real customers. In such situations, abrupt traffic patterns may elevate the possibility of an outage. Such traffic patterns may be observed in various scenarios, for example, scheduled movie/TV show premieres at a specific time, an event day for shopping, sudden security attack, offline viewing, and other scenarios where there is a dramatic change in traffic in a short period of time.

The testing system 116 may provide various benefits, which may include, but are not limited to reduced lead time in testing failures across systems for anticipated event days that draws large crowds, reduced hacks, frustration, and manual coordination related to testing failures which increases developer throughput, reduced blast radius of failure testing, ability to test degraded experiences surgically, ability to test cascading failures, ability to test high latency and time out of requests to specific systems while retaining the underlying call patterns, and reduced complexity when there is a high degree of parallelism in failure testing in the production or lower environment. The testing system 116 may further simulate race conditions, data corruption, deadlocks from resource contention, and the like by providing corresponding symptoms in the fault injection request.

The testing system 116, as proposed in the present disclosure, makes it easy to programmatically simulate system level failure with less effort in cases where atomicity, consistency or durability of a transaction or change fails. As creating a system level failure for testing often involves a lot of coordination between service and infrastructure teams which impacts the frequency of such testing and also impacts everyone who uses that system. The testing system 116 restricts such system level testing to a session that allows the user to test the failure without adversely impacting the productivity of other users. The testing system 116 is designed in a manner that preserves the call patterns, connectivity, and capacity of services in handling unprecedented load can be tested effectively. The testing system 116 further facilitates functional testing with more ease and less secondary impacts and overcomes the challenge of load testing that has a higher blast radius and actually impacts the performance of the system through impact to latency, metrics, circuit breakers, and the like.

Another advantage of deploying the testing system 116 is the ability to instill a culture of engineering excellence in an environment by significantly reducing the barrier to failure and resiliency testing while providing ease of use, reduced user impact and proper access controls. For any system that has huge public events, such as a media asset release, a special sale day for a holiday or other reasons for unpredictable, higher than normal load, resiliency testing is required in order to ensure availability and best user experience. The testing system 116 also witnesses reduced lead time and complexity due to increased and high degree of parallelism in failure testing failures across systems in an environment with anticipated event days that draws large crowds.

Further, the testing system 116 is operated in the blast radius, thus multiple testing scenarios may be implemented in parallel without any interference. Consequently, due to minimal dependencies, parallel evaluation or parallel assessment of such failures may be performed, thereby accelerating the testing speed of the overall system or application.

As utilized herein the terms "circuits" and "circuitry" refer to physical electronic components (for example, hardware) and any software and/or firmware ("code") which may configure the hardware, be executed by the hardware, and/or otherwise be associated with the hardware. As used herein, for example, a particular processor and memory may comprise a first "circuit" when executing first one or more lines of code and may comprise a second "circuit" when executing second one or more lines of code. As utilized herein, "and/or" means any one or more of the items in the list joined by "and/or". As an example, "x and/or y" means any element of the three-element set $\{(x), (y), (x, y)\}$. As another example, "x, y, and/or z" means any element of the seven-element set $\{(x), (y), (z), (x, y), (x, z), (y, z), (x, y, z)\}$. As utilized herein, the term "exemplary" means serving as a non-limiting example, instance, or illustration. As utilized herein, the terms "e.g.," and "for example" set off lists of one or more non-limiting examples, instances, or illustrations. As utilized herein, circuitry is "operable" to perform a function whenever the circuitry comprises the necessary hardware and/or code (if any is necessary) to perform the function, regardless of whether performance of the function is disabled, or not enabled, by some user-configurable setting.

The terminology used herein is for the purpose of describing particular embodiments only and is not intended to be limiting of embodiments of the disclosure. As used herein, the singular forms "a", "an" and "the" are intended to include the plural forms as well, unless the context clearly indicates otherwise. It will be further understood that the terms "comprises", "comprising", "includes" and/or "including", when used herein, specify the presence of stated features, integers, steps, operations, elements, and/or components, but do not preclude the presence or addition of one or more other features, integers, steps, operations, elements, components, and/or groups thereof.

Further, many embodiments are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, these sequences of actions described herein can be considered to be embodied entirely within any non-transitory form of computer readable storage medium having stored therein a corresponding set of computer instructions that upon execution would cause an associated processor to perform the functionality described herein. Thus, the various aspects of the disclosure may be embodied in a number of different forms, which have been contemplated to be within the scope of the claimed subject matter. In addition, for each of the embodiments described herein, the corresponding form of any such embodiments may be described herein as, for example, "logic configured to" perform the described action.

Another embodiment of the disclosure may provide a non-transitory machine and/or computer readable storage and/or media, having stored thereon, a machine code and/or a computer program having at least one code section executable by a machine and/or a computer, thereby causing the machine and/or computer to perform the steps as described herein for resiliency testing at a session level.

The present disclosure may also be embedded in a computer program product, which comprises all the features enabling the implementation of the methods described herein, and which when loaded in a computer system is able to carry out these methods. Computer program in the present context means any expression, in any language, code or notation, either statically or dynamically defined, of a set of instructions intended to cause a system having an information processing capability to perform a particular function either directly or after either or both of the following: a) conversion to another language, code or notation; b) reproduction in a different material form.

Further, those of skill in the art will appreciate that the various illustrative logical blocks, modules, circuits, algorithms, and/or steps described in connection with the embodiments disclosed herein may be implemented as electronic hardware, computer software, firmware, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The methods, sequences and/or algorithms described in connection with the embodiments disclosed herein may be embodied directly in firmware, hardware, in a software module executed by a processor, or in a combination thereof. A software module may reside in RAM memory, flash memory, ROM memory, EPROM memory, EEPROM memory, registers, hard disk, physical and/or virtual disk, a removable disk, a CD-ROM, virtualized system or device such as a virtual servers or container, or any other form of storage medium known in the art. An exemplary storage medium is communicatively coupled to the processor (including logic/code executing in the processor) such that the processor can read information from, and write information to, the storage medium. In the alternative, the storage medium may be integral to the processor.

While the present disclosure has been described with reference to certain embodiments, it will be noted understood by, for example, those skilled in the art that various changes and modifications could be made and equivalents may be substituted without departing from the scope of the present disclosure as defined, for example, in the appended claims. In addition, many modifications may be made to adapt a particular situation or material to the teachings of the present disclosure without departing from its scope. The functions, steps and/or actions of the method claims in accordance with the embodiments of the disclosure described herein need not be performed in any particular order. Furthermore, although elements of the disclosure may be described or claimed in the singular, the plural is contemplated unless limitation to the singular is explicitly stated. Therefore, it is intended that the present disclosure is not limited to the particular embodiment disclosed, but that the present disclosure will include all embodiments falling within the scope of the appended claims.

What is claimed is:

1. A system, comprising:
   a memory for storing instructions; and
   one or more processors configured to execute the instructions, and based on the executed instructions, the one or more processors are further configured to:
   receive a fault injection request from a client device associated with a user,
      wherein the fault injection request defines an active impairment of one of a service or an endpoint with a blast radius restricted to a scope of the received fault injection request, and
      wherein the scope of the received fault injection request is limited to a single session in a production environment and does not impact other users of the service or the endpoint;
   transmit a session state test payload to the client device based on the fault injection request;
   receive, from the client device, a client request within the blast radius of the active impairment and comprising the session state test payload,
      wherein, based on the session state test payload and a persistence within the blast radius, the one of the service or the endpoint is impaired in the single session; and
   transmit, to the client device, a response associated with the one of the service or the endpoint,
      wherein the response comprises characteristic variables pertaining to the active impairment of the one of the service or the endpoint in the single session.

2. The system according to claim 1, wherein the one of the service or the endpoint corresponds to the scope of the fault injection request.

3. The system according to claim 1, wherein the characteristic variables comprise a plurality of connectivity characteristics, and
   wherein the plurality of connectivity characteristics comprises at least one of a network path and a call pattern.

4. The system according to claim 1, wherein one or more impairments of one or more other services or other endpoints are cascaded in addition to the active impairment of the one of the service or the endpoint,
   wherein each of the other services or endpoints is different from the service or the endpoint.

5. The system according to claim 1, wherein the fault injection request corresponds to one of a service-to-service connectivity, time-out, cascading impairments across other services, independent of a change of call patterns and connectivity graph.

6. The system according to claim 1, wherein the one or more processors are further configured to define and persist a run time behavioral of at least one of the service or the endpoint based on a defined criteria.

7. The system according to claim 6, wherein the one or more processors are further configured to determine the defined criteria corresponding to at least a status code or a response time of the one of the service or the endpoint.

8. The system according to claim 6, wherein the one or more processors are further configured to determine the defined criteria based on an instruction set configured to control a behavioral of the system,
wherein the controlled behavioral corresponds to one of committing a change or rolling back.

9. The system according to claim 6, wherein the one or more processors are further configured to determine the defined criteria based on an exit code or data written to a file or a data structure, and
wherein the exit code or the data is consumed by the one of the service or the endpoint or a different service or a different endpoint.

10. The system according to claim 6, wherein the one or more processors are further configured to determine the defined criteria based on updating or overriding session state variables.

11. The system according to claim 6, wherein the one or more processors are further configured to determine the defined criteria that corresponds to one of deleting, corrupting, preventing access or hiding data that causes failure of the one of the service or the endpoint.

12. The system according to claim 1, wherein the one or more processors are further configured to test a change in behavioral of the one of the service or the endpoint in a simulated error state based on one or more non-persistent changes after processing the fault injection request or prevention from processing the fault injection request completely or partially based on the simulated error state.

13. The system according to claim 1, wherein the one or more processors are further configured to test the client device or the service based on a return code, and
wherein the return code triggers and validates an expected behavioral in a client application at the client device or the service called by the client application.

14. The system according to claim 1, wherein the one or more processors are further configured to:
update a configuration of injected faults for the single session; and
reset the single session at run time for the updated configuration of the injected faults for the single session.

15. The system according to claim 1, wherein the one or more processors are further configured to activate a kill switch for an automated impairment that is run against the fault injection request.

16. The system according to claim 1, wherein the one or more processors are further configured to automatically detect failures in a dashboard based on a change to a traffic pattern.

17. The system according to claim 1, wherein the fault injection request includes a time-to-live (TTL) field to specify a defined timeframe after which a recovery mode is enabled.

18. The system according to claim 17, wherein the one or more processors are further configured to self-destruct the fault injection request after the defined timeframe.

19. A method, comprising:
receiving, by one or more processors, a fault injection request from a client device associated with a user,
wherein the fault injection request defines an active impairment of one of a service or an endpoint with a blast radius restricted to a scope of the received fault injection request, and
wherein the scope of the received fault injection request is limited to a single session in a production environment and does not impact other users of the service or the endpoint;
transmitting, by the one or more processors, a session state test payload to the client device based on the fault injection request;
receiving, by the one or more processors and from the client device, a client request within the blast radius of the active impairment and comprising the session state test payload,
wherein based on the session state test payload and a persistence within the blast radius, the one of the service or the endpoint is impaired in the single session; and
transmitting, by the one or more processors, a response associated with the one of the service or the endpoint to the client device,
wherein the response comprises characteristic variables pertaining to the active impairment of the one of the service or the endpoint in the single session.

20. A non-transitory computer readable medium, having stored thereon, computer executable code, which when executed by one or more processors, cause the one or more processors to execute operations, the operations comprising:
receiving a fault injection request from a client device associated with a user,
wherein the fault injection request defines an active impairment of one of a service or an endpoint with a blast radius restricted to a scope of the received fault injection request, and
wherein the scope of the received fault injection request is limited to a single session in a production environment and does not impact other users of the service or the endpoint;
transmitting a session state test payload to the client device based on the fault injection request;
receiving, from the client device, a client request within the blast radius of the active impairment and comprising the session state test payload,
wherein based on the fault injection request and a persistence within the blast radius, the one of the service or the endpoint is impaired in the single session; and
transmitting, to the client device, a response associated with the one of the service or the endpoint,
wherein the response comprises characteristic variables pertaining to the active impairment of the one of the service or the endpoint in the single session.

* * * * *